United States Patent
Bahar et al.

(10) Patent No.: US 12,161,142 B2
(45) Date of Patent: *Dec. 10, 2024

(54) METHODS FOR USING HIGH-FIBER, LOW-SUGAR SOLUBLE DIETARY FIBERS

(71) Applicant: Tate & Lyle Solutions USA LLC, Hoffman Estates, IL (US)

(72) Inventors: Mark Bahar, Des Plains, IL (US); Juhi Tomar, Shaumburg, IL (US); Mervyn de Souza, South Elgin, IL (US); Annette Evans, St. Charles, IL (US)

(73) Assignee: Tate & Lyle Solutions USA LLC, Hoffman Estates, IL (US)

( * ) Notice: Subject to any disclaimer, the term of this patent is extended or adjusted under 35 U.S.C. 154(b) by 37 days.

This patent is subject to a terminal disclaimer.

(21) Appl. No.: 18/073,761

(22) Filed: Dec. 2, 2022

(65) Prior Publication Data

US 2023/0095865 A1 Mar. 30, 2023

Related U.S. Application Data

(62) Division of application No. 16/750,882, filed on Jan. 23, 2020, now Pat. No. 11,540,549.

(60) Provisional application No. 62/941,778, filed on Nov. 28, 2019.

(51) Int. Cl.
| | |
|---|---|
| A23L 33/21 | (2016.01) |
| A23L 2/38 | (2021.01) |
| A23L 2/52 | (2006.01) |
| A23L 19/20 | (2016.01) |
| C12C 5/02 | (2006.01) |
| C12C 11/00 | (2006.01) |
| C12G 1/00 | (2019.01) |
| C12G 3/04 | (2019.01) |

(52) U.S. Cl.
CPC .............. *A23L 33/21* (2016.08); *A23L 2/382* (2013.01); *A23L 2/52* (2013.01); *A23L 19/20* (2016.08); *C12C 5/02* (2013.01); *C12C 11/003* (2013.01); *C12G 1/00* (2013.01); *C12G 3/04* (2013.01); *A23V 2002/00* (2013.01)

(58) Field of Classification Search
CPC .......... A23L 33/21; A23L 19/20; A23L 2/382; A23L 2/52; C12C 5/02; C12C 11/003; C12G 1/00; C12G 3/04; A23V 2002/00
USPC ......................................................... 426/16
See application file for complete search history.

(56) References Cited

U.S. PATENT DOCUMENTS

| | | |
|---|---|---|
| 2,610,930 A | 9/1952 | Cleland |
| 2,613,206 A | 10/1952 | Caldwell |
| 2,661,349 A | 12/1953 | Caldwell et al. |
| 2,719,179 A | 9/1955 | Mora et al. |
| 2,767,109 A | 10/1956 | Fetzer |
| 3,337,414 A | 8/1967 | Wilson |
| 3,535,123 A | 10/1970 | Heady |
| 3,729,380 A | 4/1973 | Sugimoto et al. |
| 3,876,794 A | 4/1975 | Rennhard |
| 4,247,568 A | 1/1981 | Carrington et al. |
| 4,518,581 A | 5/1985 | Miyake et al. |
| 4,521,252 A | 6/1985 | Miyake et al. |
| 4,618,579 A | 10/1986 | Dwiggins et al. |
| 4,619,831 A | 10/1986 | Sharma |
| 4,626,288 A | 12/1986 | Trzasko et al. |
| 4,631,195 A | 12/1986 | Colliopoulos et al. |
| 4,698,232 A | 10/1987 | Sheu et al. |
| 4,782,045 A | 11/1988 | Machida et al. |
| 4,937,091 A | 6/1990 | Zallie et al. |
| 4,956,458 A | 9/1990 | Luo et al. |
| 4,965,354 A | 10/1990 | Yanaki et al. |
| 5,041,541 A | 8/1991 | Mazur |
| 5,051,271 A | 9/1991 | Iyengar et al. |
| 5,089,171 A | 2/1992 | Chiu |
| 5,139,575 A | 8/1992 | Matsuda et al. |
| 5,236,719 A | 8/1993 | Meyers et al. |
| 5,242,418 A | 9/1993 | Weinstein |
| 5,281,276 A | 1/1994 | Chiu et al. |
| 5,364,652 A | 11/1994 | Ohkuma et al. |
| 5,368,878 A | 11/1994 | Smick et al. |
| 5,372,835 A | 12/1994 | Little et al. |
| 5,376,399 A | 12/1994 | Dreese et al. |
| 5,378,286 A | 1/1995 | Chiou et al. |
| 5,378,491 A | 1/1995 | Stanley et al. |
| 5,387,426 A | 2/1995 | Harris et al. |

(Continued)

FOREIGN PATENT DOCUMENTS

| | | |
|---|---|---|
| CA | 1031332 | 5/1978 |
| CN | 1616634 A | 5/2005 |

(Continued)

OTHER PUBLICATIONS

IPR2017-01506, Patent Owner Preliminary Response, filed Sep. 8, 2017.

(Continued)

*Primary Examiner* — Brent T O'Hern

(74) *Attorney, Agent, or Firm* — McDonnell Boehnen Hulbert & Berghoff LLP

(57) ABSTRACT

The present disclosure provides soluble dietary fibers, food and beverage products including them, and methods for using them. In one aspect, the disclosure provides a method for improving body in a fermented beverage, the method including providing a soluble dietary fiber having a fiber content of at least 97% as measured by AOAC 2001.03 and a DP1+DP2 content of no more than 3 wt % (e.g., no more than 2 wt %) on a dry solids basis in the fermented beverage.

21 Claims, No Drawings

(56) References Cited

U.S. PATENT DOCUMENTS

| | | |
|---|---|---|
| 5,395,640 A | 3/1995 | Harris et al. |
| 5,409,542 A | 4/1995 | Henley et al. |
| 5,436,019 A | 7/1995 | Harris et al. |
| 5,472,732 A | 12/1995 | Ohkuma et al. |
| 5,496,861 A | 3/1996 | Rouse et al. |
| 5,573,794 A | 11/1996 | Duflot |
| 5,593,503 A | 1/1997 | Shi et al. |
| 5,651,936 A | 7/1997 | Reed et al. |
| 5,698,437 A | 12/1997 | Matsuda et al. |
| 5,711,986 A | 1/1998 | Chiu et al. |
| 5,714,600 A | 2/1998 | McNaught et al. |
| 5,780,620 A | 7/1998 | Mandai et al. |
| 5,849,090 A | 12/1998 | Haralampu et al. |
| 5,886,168 A | 3/1999 | Brumm |
| 5,902,410 A | 5/1999 | Chiu et al. |
| 5,904,941 A | 5/1999 | Xu et al. |
| 5,962,047 A | 10/1999 | Gross et al. |
| 6,013,299 A | 1/2000 | Haynes et al. |
| 6,025,168 A | 2/2000 | Vercauteren et al. |
| 6,043,229 A | 3/2000 | Kettlitz et al. |
| 6,054,302 A | 4/2000 | Shi et al. |
| 6,090,594 A | 7/2000 | Kettlitz et al. |
| 6,113,976 A | 9/2000 | Chiou et al. |
| 6,153,246 A | 11/2000 | Gossart |
| 6,248,375 B1 | 6/2001 | Gilles et al. |
| 6,274,567 B1 | 8/2001 | Brown et al. |
| 6,299,924 B1 | 10/2001 | Chiu et al. |
| 6,303,174 B1 | 10/2001 | McNaught et al. |
| 6,348,452 B1 | 2/2002 | Brown et al. |
| 6,352,733 B1 | 3/2002 | Haynes et al. |
| 6,423,364 B1 | 7/2002 | Altemueller et al. |
| 6,468,355 B1 | 10/2002 | Thompson et al. |
| 6,528,498 B2 | 3/2003 | Brown et al. |
| 6,613,373 B2 | 9/2003 | Haynes et al. |
| 6,623,943 B2 | 9/2003 | Schmiedel et al. |
| 6,664,389 B1 | 12/2003 | Shi et al. |
| 6,670,155 B2 | 12/2003 | Antrim et al. |
| 6,696,563 B2 | 2/2004 | Bengs et al. |
| 6,740,350 B2 | 5/2004 | Pfeiffer |
| 6,762,346 B2 | 7/2004 | Kossmann et al. |
| 6,844,172 B2 | 1/2005 | Bergsma et al. |
| 6,890,571 B2 | 5/2005 | Shi et al. |
| 6,896,915 B2 | 5/2005 | Shi et al. |
| 6,927,048 B2 | 8/2005 | Verser et al. |
| 6,929,817 B2 | 8/2005 | Shi et al. |
| 7,081,261 B2 | 7/2006 | Shi et al. |
| 7,211,662 B2 | 5/2007 | Backer et al. |
| 7,435,431 B2 | 10/2008 | Johnson |
| 7,638,151 B2 | 12/2009 | Duan et al. |
| 8,993,039 B2 | 3/2015 | Harrison et al. |
| 9,783,619 B2 | 10/2017 | Bureau et al. |
| 9,868,969 B2 | 1/2018 | Harrison et al. |
| 2002/0162138 A1 | 10/2002 | Kossmann et al. |
| 2002/0192291 A1 | 12/2002 | Bergsma et al. |
| 2002/0192344 A1 | 12/2002 | Brendel et al. |
| 2002/0192355 A1 | 12/2002 | Serpelloni |
| 2003/0039721 A1 | 2/2003 | Shah et al. |
| 2003/0045504 A1 | 3/2003 | Brown et al. |
| 2003/0134394 A1 | 7/2003 | Antrim et al. |
| 2003/0215499 A1 | 11/2003 | Shi et al. |
| 2003/0215561 A1 | 11/2003 | Shi et al. |
| 2003/0215562 A1 | 11/2003 | Shi et al. |
| 2003/0219520 A1 | 11/2003 | Shi et al. |
| 2004/0092732 A1 | 5/2004 | Antrim et al. |
| 2004/0213882 A1 | 10/2004 | Lauridsen |
| 2005/0095350 A1 | 5/2005 | Barresi et al. |
| 2005/0159329 A1 | 7/2005 | Fuertes et al. |
| 2006/0188633 A1 | 8/2006 | Matsuda et al. |
| 2006/0210696 A1 | 9/2006 | Liu et al. |
| 2007/0087084 A1 | 4/2007 | Coleman et al. |
| 2007/0172931 A1 | 7/2007 | Harrison et al. |
| 2007/0184177 A1 | 8/2007 | Harrison et al. |
| 2008/0175977 A1 | 7/2008 | Harrison et al. |
| 2011/0028427 A1* | 2/2011 | McManus ............... A23L 33/24 426/243 |
| 2012/0034366 A1 | 2/2012 | Hoffman et al. |
| 2015/0181918 A1 | 7/2015 | Harrison et al. |
| 2016/0066614 A1 | 3/2016 | Ito et al. |
| 2017/0318850 A1 | 11/2017 | Fosdick et al. |
| 2018/0371514 A1 | 12/2018 | Harrison et al. |
| 2022/0408779 A1* | 12/2022 | Bahar ............... A23L 33/125 |

FOREIGN PATENT DOCUMENTS

| | | |
|---|---|---|
| EP | 363741 | 4/1990 |
| EP | 0452262 | 4/1991 |
| EP | 487000 | 5/1991 |
| EP | 486936 | 5/1992 |
| EP | 529893 | 3/1993 |
| EP | 529894 | 3/1993 |
| EP | 0540421 | 5/1993 |
| EP | 553368 | 8/1993 |
| EP | 0 499 648 | 12/1993 |
| EP | 806434 | 11/1997 |
| EP | 0 884 384 | 12/1998 |
| EP | 0 688 872 | 3/1999 |
| EP | 1 088 832 | 4/2001 |
| EP | 0 846 704 | 3/2002 |
| EP | 1 362 869 | 11/2003 |
| EP | 0875585 | 1/2004 |
| EP | 0875585 B1 | 1/2004 |
| EP | 1382687 | 1/2004 |
| EP | 1616570 | 1/2006 |
| EP | 1867710 A1 | 12/2007 |
| EP | 1978826 | 10/2008 |
| EP | 3556217 A1 | 10/2019 |
| FR | 2044670 A1 | 2/1971 |
| JP | 61-205494 | 9/1986 |
| JP | 61-212296 | 9/1986 |
| JP | 61219392 | 9/1986 |
| JP | 61-22777 | 10/1986 |
| JP | S62-91502 | 4/1987 |
| JP | 63109791 | 5/1988 |
| JP | S63-109790 | 5/1988 |
| JP | S63-291588 | 11/1988 |
| JP | H01-012762 | 3/1989 |
| JP | 02-100695 | 4/1990 |
| JP | H02163101 A | 6/1990 |
| JP | 03-163101 | 7/1991 |
| JP | 03175989 | 7/1991 |
| JP | 04-135495 | 5/1992 |
| JP | 04-237497 | 8/1992 |
| JP | 404290809 | 10/1992 |
| JP | H06-32802 | 2/1994 |
| JP | H07-191 | 1/1995 |
| JP | H07-59585 | 3/1995 |
| JP | 07-227300 | 8/1995 |
| JP | H089953 A | 1/1996 |
| JP | H0870842 A | 3/1996 |
| JP | 410080294 | 3/1998 |
| JP | 410191931 | 7/1998 |
| JP | 11-056336 | 3/1999 |
| JP | H1156336 A | 3/1999 |
| JP | H11116602 A | 4/1999 |
| JP | H11346708 A | 12/1999 |
| JP | 2001-011101 | 1/2001 |
| JP | 2001-031574 | 2/2001 |
| JP | 02001231469 | 8/2001 |
| JP | 2001252064 A | 9/2001 |
| JP | 2003-144187 | 5/2003 |
| JP | 2004016025 A | 1/2004 |
| JP | 2004113146 A | 4/2004 |
| JP | 2005-047829 | 2/2005 |
| JP | 2005263867 A | 9/2005 |
| JP | 2007006872 A | 1/2007 |
| JP | 2018139554 A | 9/2018 |
| KR | 20090025783 A | 3/2009 |
| KR | 101705456 B1 | 2/2017 |
| WO | 91/01706 | 5/1991 |
| WO | 93/03629 | 3/1993 |
| WO | 1993005663 A1 | 4/1993 |
| WO | 96/08261 | 3/1996 |
| WO | 96/09815 | 4/1996 |
| WO | 98/15347 | 4/1998 |

(56) References Cited

FOREIGN PATENT DOCUMENTS

| WO | WO 98/41545 | 9/1998 |
|---|---|---|
| WO | WO 99/28490 | 6/1999 |
| WO | 00/14249 | 3/2000 |
| WO | 200167895 | 9/2001 |
| WO | 2003085139 | 10/2003 |
| WO | WO 2004/031244 A1 | 4/2004 |
| WO | 05/040223 | 5/2005 |
| WO | 06/041563 | 4/2006 |
| WO | 2006101648 | 9/2006 |
| WO | 08/085529 | 7/2008 |
| WO | WO 2008085529 | 7/2008 |
| WO | 2009051127 A1 | 4/2009 |
| WO | 2010020321 | 2/2010 |
| WO | 2012018679 | 2/2012 |
| WO | 2013146348 A1 | 10/2013 |

OTHER PUBLICATIONS

IPR2017-01507, Patent Owner Preliminary Response, filed Sep. 11, 2017.
IPR2017-01507, Petitioner's Preliminary Reply to Patent Owner's Preliminary Response, filed Oct. 10, 2017.
IPR2017-01507, Supplemental Expert Declaration of Alexei Demchenko, Ph.D., filed Oct. 10, 2017.
IPR2017-01507, Patent Owner's Surreply to Petitioner's Preliminary Reply to Patent Owner's Preliminary Response, filed Oct. 17, 2017.
IPR2017-01507, Declaration of Dr. Robert Linhardt, filed Oct. 17, 2017.
AOAC Official Method Mar. 2001 "Dietary Fiber in Foods Containing Resistant Maltodextrin" (2002).
Briand, "Avis de l'Agence francaise de securite sanitaire des aliments relatif a l'evaluation de la qualification comme fibre alimentaire soluble d'une dextrine et des justificatifs des allegations nutritionnelles qui lui sont associees," Afssa—Reference No. 2005-SA-0283 dated Jul. 30, 2007 (Submitted with English Machine Translation).
Declaration by Jean-Michel Roturier, pp. 1-5 (English Machine Translation).
"Food and drugs," Code of Federal Regulations 21, Parts 100 to 169, 21:19-35 (Revised as of Apr. 1, 2010).
Nutriose GRAS Notice 436, dated Jul. 9, 2012.
Reponse to Communication pursuant to Rule 161(1) and 162 EPC to the European Patent Office for EP 11746073.3 dated Oct. 14, 2013.
Fuwa et al., Eds., Dictionary of Starch Science, 133-36 (2003). (Provided as English translation).
Koizumi et al. "High-Perfomance Anion-Exchange Chromatography of Homogeneous D-Gluco-Oligosaccharides and -Polysaccharides (Polymerization Degree ≥ 50) with Pulsed Amperometric Detection." Journal of Chromatograph, 1989, vol. 464, pp. 365-373.
Hanashiro et al. "A period distribution of the chain length of amylopectin as revealed by high-performance anion-exchange chromatography." Carbohydrate Research, 1996, vol. 283, pp. 151-159.
Koizumi et al. "Estimation of the distribution of chain length of amylopectins by high-performance liquid chromatography with pulsed amperometric detection." Journal of Chromatography, 1991, vol. 585, pp. 233-238.
Swallow et al. "Analysis and Quantitation of the Carbohydrates in Honey Using High-Performance Liquid Chromatography." J. Agric. Food Chem., 1990, vol. 38, pp. 1828-1832.
van der Hoeven et al. "Characterization of sugar oligomers by on-line high-performance anion-exchange chromatography-thermospray mass spectrometry." Journal of Chromatography, 1992, vol. 627, pp. 63-73.
Campbell et al. "Selected Fructooligosaccharide (1-Kestose, Nystose, and 1F-β-Fructofuranosylnystose) Composition of Foods and Feeds." J. Agric. Food Chem., 1997, vol. 45, pp. 3076-3082.

Chatterton et al. "Fructan oligomers in Poa ampla." New Phytol., 1997, vol. 136, pp. 3-10.
Mou et al. "Determination of xylose oligomers and monosaccharides by anion-exchange chromatography with pulsed amperometric detection." Journal of Chromatography, 1991, vol. 546, pp. 289-295.
McDougall et al. "Purification and analysis of growth-regulating xyloglucan-derived oligosaccharides by high-pressure liquid chromatography." Carbohydrate Research, 1991, vol. 219, pp. 123-132.
Ammeraal et al. "High-performance anion-exchange chromatography with pulsed amperometric detection of linear and branched glucose oligosaccharides." Carbohydrate Research, 1991, vol. 215, pp. 179-192.
Product Manual for CarboPac@ MA1, CarboPac@ PA1, CarboPac® PA10, CarboPac® PA100. Dionex Corporation Document No. 031824, Revision 8. May 2010. 82 pages.
Cataldi et al. "Carbohydrate analysis by high-performance anion-exchagne chromatography with pulsed amperometric detection: The potential is still growing." Fesenius J. Anal. Chem., 2000, vol. 368, pp. 739-758.
Duedahl-Olesen et al. "Rapid detection of malto-oligosaccharide-forming bacterial amylases by high performance anion-exchange chromatography." Letters in Applied Microbiology, 2000, vol. 30, pp. 312-316.
Durgnat et al. "Determination of fructooligosaccharides in raw materials and finished products by HPAE-PAD." Seminars in Food Analysis, 1997, vol. 2, pp. 85-97.
Finke et al. "Analysis of High-Molecular-Weight Oligosaccharides from Human Milk by Liquid Chromatography and MALDI-MS." Anal. Chem, 1999, vol. 71, pp. 3755-3762.
Johansson et al. "Hydrolysis of β-glucan." Food Chemistry, 2006, vol. 97, pp. 71-79.
Koch et al. "Quantitative analysis of amylopectin unit chains by means of high-performance anion-exchange chromatography with pulsed amperometric detection." Journal of Chromatrography A, 1998, vol. 800, pp. 199-206.
Landberg et al. "Temperature effects in high-performance anion-exchange chromatography of oligosaccharides." Journal of Chromatography A, 1998, vol. 814, pp. 97-104.
Lee. "Carbohydrate analyses with high-performance anion-exchange chromatography." Journal of Chromatography A, 1996, vol. 720, pp. 137-149.
L'Homme et al. "Effect of food-processing on the degradation of fructooligosaccharides in fruit." Food Chemistry, 2003, vol. 82, pp. 533-537.
Lu et al. "Evaluating Sodium Salts as Pushing Agents on High-Performance Anion-Exchange Chromatography with Pulsed Amperometric Detection for Maltodextrin Analysis." Starch/Starke, 1997, vol. 49, No. 12, pp. 505-511.
Martens et al. "Determination of saccharides in biological materials by high-performance anion-exchange chromatography with pulsed amperometric detection." Journal of Chromatography, 1991, vol. 546, pp. 297-309.
Rohrer. "Chapter 2: High-Performance Anion-Exchange Chromatography with Pulsed Amperometric Detection for the Determination of Oligosaccharides in Foods and Agricultural Products." In Oligosaccharides in Food and Agriculture; Eggleston G., et al.; ACS Symposium Series; American Chemical Society: Washington, DC, 2003. 16 pages.
Abballe et al. "Study of molar response of dextrans in electrochemical detection." Journal of Chromatography A, 2007, vol. 1149, pp. 38-45.
Swanson et al. "Separation and identification of neisserial lipooligosaccharide oligosaccharides using high-performance anion-exchange chromatography with pulsed amperometric detection." Carbohydrate Research, 2006, vol. 341, pp. 388-396.
"Application Note 67: Determination of Plant-Derived Neutral Oligo- and Polysaccharides." Dionex Corporation. 2003. 12 pages.
"Handbook of amylases and related enzymes. Their sources, isolation methods, properties and applications," edited by The Amylase Research Society of Japan, Pergamon Press (1988).
Advisory Action for U.S. Appl. No. 11/339,306, mailed on Feb. 13, 2009 (pp. 1-6).

(56) References Cited

OTHER PUBLICATIONS

Affidavit of Christopher Butler, dated Dec. 29, 2016 (pp. 1-2).
Allingham, "Polydextrose—A New Food Ingredient: Technical Aspects" in "Chemistry of Food and Beverages: Recent Developments," Edited by George Charalambous and George Inglett, Academic Press (1982).
Appeal Brief Request for Review for U.S. Appl. No. 11/339,306, dated May 15, 2009 (pp. 1-24).
Craig et al., "Chapter 18: Polydextrose as Soluble Fiber and Complex Carbohydrate," in "Complex Carbohydrates in Foods," edited by S.S. Cho, L. Prosky, M. Dreher; Marcel Dekker, Inc., New York, CRC Press, 1 edition (1999).
Cummings and Englyst, "Gastrointestinal effects of food carbohydrate," Am J Clin Nutr. 61(4 Suppl):938S-945S (1995).
Datta et al., "Enzyme immobilization: an overview on techniques and support materials," 3 Biotech. 3(1): 1-9 (2013).
Cargill Sweetners, "Product information clearsweet 95% dextrose corn syrup," Exhibit A, pp. 1-5 (2001).
Englyst et al., "Dietary fiber and resistant starch," Am J Clin Nutr. 46(6):873-4 (1987).
Englyst et al., "Classification and measurement of nutritionally important starch fractions," Eur J Clin Nutr. 46 Suppl 2:S33-50 (1992).
Final Office Action for U.S. Appl. No. 11/532,219, mailed Nov. 9, 2009 (pp. 1-6).
Final Office Action for U.S. Appl. No. 11/532,219, mailed Jul. 1, 2011 (pp. 1-6).
International Union of Pure and Applied Chemistry (IUPAC), "Nomenclature of Carbohydrates," Recommendations 1996.
Lehninger et al., "Principles of Biochemistry," Third Edition, Worth Publishers: New York (2000).
Non-Final Office Action for U.S. Appl. No. 11/532,219, mailed Jun. 8, 2009 (pp. 1-5).
Non-Final Office Action for U.S. Appl. No. 11/532,219, mailed Oct. 26, 2010 (pp. 1-5).
Non-Final Office Action for U.S. Appl. No. 11/532,219, mailed Jan. 28, 2011 (pp. 1-6).
Notice of Allowance and Interview Summary for U.S. Appl. No. 11/339,306, mailed Jul. 24, 2009.
Notice of Allowance and Interview Summary for U.S. Appl. No. 11/339,306, mailed Aug. 26, 2011.
Nutritive Sweeteners From Corn tables for syrup, 7th Edition (2002), pp. 1-36.
Originally filed claims for U.S. Appl. No. 11/532,219, filed Sep. 15, 2006.
Pre-Appeal Brief Request for Review for U.S. Appl. No. 11/339,306, dated Mar. 2, 2009 (pp. 1-11).
Response to Final Office Action for U.S. Appl. No. 11/339,306, dated Jan. 29, 2009 (pp. 1-17).
Response to Final Office Action for U.S. Appl. No. 11/532,219, dated Jan. 8, 2010 (pp. 1-24).
Response to Final Office Action for U.S. Appl. No. 11/532,219, dated Aug. 17, 2011 (pp. 1-15).
Response to Office Action for U.S. Appl. No. 11/532,219, dated Aug. 25, 2009 (pp. 1-18).
Response to Office Action for U.S. Appl. No. 11/532,219, dated May 25, 2011 (pp. 1-14).
Reply to Office Communication pursuant to Article 94(3) EPC issued by the European Patent Office for European Application No. EP07872204.8, dated Aug. 26, 2015 (pp. 1-13).
Request for Continued Examination Under 37 CFR 1.114 or U.S. Appl. No. 11/532,219, dated Feb. 8, 2010 (pp. 1-20).
Smiles, "The Functional Applications of Polydextrose" in "Chemistry of Food and Beverages: Recent Developments," Edited by George Charalambous and George Inglett, Academic Press (1982).
Tewari et al., "Thermodynamics of hydrolysis of disaccharides. Cellobiose, gentiobiose, isomaltose, and maltose," J Biol Chem. 264(7):3966-71 (1989).
"Fibersol-2: Digestion Resistant Maltodextrin" ADM Specialty Food Ingredients. 2004, 8 pages.
Westerlund et al. "Isolation and chemical characterization of water-soluble mixed-linked beta-glucans and arabinoxylans in oat milling fractions." Carbohydrate Polymers, Applied Science Publishers, LTD. Barking, GB, vol. 20, No. 2, 1993, pp. 115-123.
Written Opinion and International Search Report of International Application No. PCT/US2020/062522, mailed Mar. 3, 2021, 11 pages.
Rastall et al., (Dec. 1992) "Enzymatic Synthesis of Oligosaccharides," Biotechnology and Genetic Engineering Reviews, vol. 10:1, pp. 253-282.
Pontoh et al., (1995) "Glucose Syrup Production from Indonesian Palm and Cassava Starch," Food Research Internationa, vol. 28, No. 4, pp. 379-385.
Goulas, et al.; "Purification of Oligosaccharides by Nanofiltration;" Journal of Membrane Science 209; pp. 321-335; 2002.
European Extended Search Report dated Oct. 22, 2013; Appl. No. EP13181573.0-1358; 9 pages.
Hayakawa, Y.; "New Knowledge of Oligosaccharide;" Japan Innovative Food Ingredients Research Center; pp. 169-170; pp. 176-177; Nov. 20, 1998.
Fuwa, E.; Amyloid Science Dictionary; pp. 447-448, pp. 532; Mar. 20, 2003.
Kawazoe, K.; Food Chemicals 4; pp. 98; Dec. 20, 1990.
PCT/US2008/078904 International Search Report (Dec. 15, 2008).
Sievert et al., Cereal Chemistry 66:342-347 (1989).
Sievert et al., Cereal Chemistry 67:217-221 (1990).
Nikolov et al., Biotechnology and Bioengineering 34:694-704 (1989).
Bourquelot et al., Joun de Pharm et de Chim 7:569-573, 598 (Jun. 16, 1912) (translation attached).
El-Sayed et al., Acta Alimentaria 23:43-58 (1994).
Cho, Complex Carbohydrates in Foods, 1999.
Russell, The Nutrition and Health Dictionary, Corn Syr 1995.
H1394 issued Jan. 3, 1995, Dreese.
H1395 issued Jan. 3, 1995, Prosser.
Ohkuma et al., "Pyrolysis of Starch and its Digestibility by Enzymes—Characterization of Indigestible Dextrin—" Publication 3:Starch Science vol. 37, No. 2, pp. 07-114, 1990.
Notice of Opposition (Cabinet Plasseraud) in European Patent 2 600 735, dated Jan. 6, 2017, provided with English Translation of substantive remarks (pp. 3-12).
Lefranc-Millot., "Nutriose 06: a useful soluble dietary fibre for added nutritional value," Nutrition Bulletin, 33, 234-39 (2008).
Notice of Opposition _AWA) in European Patent 2 600 735, dated Jan. 1, 2017, provided with D5-09 and D19 (chromatograms 1-6).
Dionex, "Determination of Plant-Derived Neutral Oligo- and Polysaccharides," Dionex Application Note 67, 2003.
Dionex, "Product Manual for CarboPac(R) MA1, PA1, PA10, PA100", Dionex, Dec. 2010.
Mitchell, Ed., "Sweeteners and Sugar Alternatives in Food Technology," pp. 380-387 (2008).
Lefranc-Millot, "Nutriose, a low-GR soluble fibre with an outstanding tolerance factor," FoodNews Alsiano, 15(157), Apr. 7-8, 2008.
Dufour, "Nutriose FB 06, a new soluble prebiotic fibre," Roquette Food Business Unit, presented at Alsiano Food Seminar, Sep. 23, 2004.
Roquette, "Nutriose(R) soluble fibre" (May 2008).
National Starch, "Fiber 2.0: Invisible in Your Food—Easy on Your Digestive System", (2008).
ADM Specialty Food Ingredients, "Fiubersol-2" (2004).
Kaneko et al., "Digestibility Characteristics of Isomaltooligosaccharides in Comparison with Several Saccharides using the Rat Jejunum Loop Method," Bioscki. Biotech. Biochem., 59(7), 1190-94 (1995).
Bornet et al., "Nutritional aspects of short-chain fructooligosaccharides: natural occurrence, chemistry, physiology and health implications," Digest Liv. Dis., 34, 111-120 (2000).
IPR2017-01506, Patent Owner's Response filed Mar. 2, 2018,.

* cited by examiner

METHODS FOR USING HIGH-FIBER, LOW-SUGAR SOLUBLE DIETARY FIBERS

CROSS-REFERENCE TO RELATED APPLICATIONS

This application is a division of U.S. patent application Ser. No. 16/750,882, filed Jan. 23, 2020 which claims the benefit of priority of U.S. Provisional Patent Application 62/941,778, filed Nov. 28, 2019, each of which is hereby incorporated herein by reference in its entirety.

BACKGROUND OF THE DISCLOSURE

1. Field of the Disclosure

The present disclosure relates generally to soluble dietary fibers. More particularly, the present disclosure relates to high-fiber, low-sugar soluble dietary fibers and their use in a variety of food and beverage applications including fermented foods and beverages like beer and sake.

2. Technical Background

Soluble dietary fiber is commonly utilized in food and beverage products to provide a variety of desirable characteristics, including nutrition and texture. Among myriad other applications, soluble dietary fibers are of interest for application in fermented beverages to provide a desirable body and mouthfeel. As soluble dietary fiber can be less chemically susceptible to amylolytic enzymes in the mashing process and to fermentation by yeast, it can be used even at early stages in the brewing process to provide desired properties in the final product. This can allow for better control of the properties of the end product. Of course, soluble dietary fiber is desirable for use in a wide variety of other food and beverage products.

Different food and beverage products have different requirements for fiber content, sugar content and rheology. As such, there remains a need for new soluble dietary fibers that have novel combinations of fiber content and sugar content, and with desirable rheological properties for use in different food and beverage applications.

SUMMARY OF THE DISCLOSURE

One aspect of the disclosure is a soluble dietary fiber having a fiber content of at least 97% as measured by AOAC 2001.03 and a combined DP1 and DP2 content of no more than 3 wt % (e.g., no more than 2 wt %) on a dry solids basis.

Another aspect of the disclosure is a soluble dietary fiber having a fiber content of at least 97% as measured by AOAC 2001.03; a combined DP1+DP2 content of no more than 3 wt % (e.g., no more than 2 wt %) on a dry solids basis; and a weight-average molecular weight in the range of 1000 g/mol to 2500 g/mol, e.g., 1600 g/mol to 2500 g/mol.

Another aspect of the disclosure is a method of improving body in a fermented beverage, the method including providing a soluble dietary fiber as otherwise described herein in the fermented beverage.

Another aspect of the disclosure is a fermented beverage comprising a soluble dietary fiber as otherwise described herein.

Another aspect of the disclosure is a method for making a food or beverage product, the method comprising (i) providing a soluble dietary fiber as otherwise described herein; and (ii) combining the soluble dietary fiber with one or more other food or beverage ingredients.

Additional aspects of the disclosure will be evident from the disclosure herein.

DETAILED DESCRIPTION

There is an ongoing trend in the food and beverage industry to offer low-calorie or no-calorie versions of popular consumables. For example, the low-alcohol (e.g., non-alcoholic) beer market is growing rapidly as consumers seek alternatives that are perceived as healthier or comply with a particular diet. However, the conventional production of low-alcohol beverages, including beer, can suffer from inferior characteristics including a thin mouthfeel and poor head retention. Low-calorie fermented beverages like light beers can similarly have thin mouthfeel and poor head retention; indeed, mouthfeel and head retention are properties that are generally desirable to improve in fermented beverages like beer and sake.

The present inventors have noted that soluble dietary fiber can be used as an ingredient in fermented beverages (e.g., beer and sake, nonalcoholic, low-alcohol or full-alcohol) to improve mouthfeel and head retention. Notably, due to the resistance of fiber to being broken down by a mashing process or to being fermented by yeast in a brewing process, the fiber can be added at any desirable time, including before fermentation (e.g., as part of the grain feed to the mash, during the mash, during lautering), during any fermentation stage, or even post-fermentation and filtering. The soluble dietary fiber can thus provide desired rheological properties to the final beverage product, including an improvement of mouthfeel (i.e., more "body") and an improvement in head retention (i.e., the length of time a foamy "head" of beer persists after pouring).

However, conventional dietary fibers can contain significant amounts of sugars (i.e., monosaccharides and disaccharides), most notably dextrose and dextrose disaccharides like maltose and isomaltose. Some of these sugars can themselves be calorific, and in many cases can be fermented by yeast in a brewing process. Further, in many products, including beer, consumers may not tolerate excessive sweetness imparted by residual sugars not removed by fermentation. As such, the present inventors have noted that a soluble dietary fiber having a high fiber content and low sugar content is desired.

In view of the observations above, the present inventors have noted a need for an economical soluble dietary fiber ingredient that has a high fiber content and a low sugar content while providing desirable rheological properties. Such a fiber would fulfill an unmet need in a number of applications such as low-calorie and/or low-alcohol beverages such as beer and sake.

Accordingly, one aspect of the disclosure is a soluble dietary fiber having a fiber content of at least 97% as measured by AOAC 2001.03 and a combined DP1 and DP2 content (e.g., a combined content of monosaccharides and disaccharides, such as dextrose and dextrose disaccharides) of no more than 3 wt % (e.g., no more than 2 wt %) on a dry solids basis. This combination of high fiber content and low sugar content can be especially useful in low-calorie applications, applications requiring low sweetness, and applications where significant fermentation of the soluble dietary fiber is undesired.

As described above, a significant attribute of the soluble dietary fiber of the present disclosure is the high fiber content. As used herein, fiber content is measured by AOAC 2001.03 and is recited on a dry solids basis. In certain embodiments as otherwise described herein, the soluble dietary fiber has a fiber content of at least 97%. For example, in certain embodiments as otherwise described herein, the fiber content as measured by AOAC 2001.03 is at least 98%. In certain desirable embodiments as otherwise described herein, the fiber content as measured by AOAC 2001.03 is at least 99%. In various other additional embodiments as otherwise described herein, the fiber content measured by AOAC 2001.03 is in the range of 97% to 110%. For example, in certain embodiments as otherwise described herein, the fiber content as measured by AOAC 2001.03 is in the range of 98% to 110%, e.g., 99% to 110%. In certain embodiments as otherwise described herein, the fiber content as measured by AOAC 2001.03 is in the range of 97% to 108%, e.g., 97% to 106%, or 97% to 103%, or 97% to 100%. In certain embodiments as otherwise described herein, the fiber content as measured by AOAC 2001.03 is in the range of 98% to 108%, e.g., 98% to 106%, or 98% to 103%, or 98% to 100%. In certain embodiments as otherwise described herein, the fiber content as measured by AOAC 2001.03 is in the range of 99% to 108%, e.g., 99% to 106%, or 99% to 103%, or 99% to 100%. The present inventors note that for certain materials as described herein, the AOAC 2001.03 measurement can in some cases provide a fiber content in excess of 100%. While the person of ordinary skill in the art will appreciate that values in excess of 100% are in one sense an experimental artifact, it will be understood that real-world fiber measurements according to AOAC 2001.03 often provide values in excess of 100%.

Another significant attribute of the soluble dietary fiber of the present disclosure is the low DP1+DP2 content (i.e., content of monomeric and dimeric material, as commonly understood in the saccharide art). This can be important for applications where low sugar content is desired, or where the sugar content of the food or beverage product comes from other sources. DP1+DP2 content is measured using HPLC, employing an Aminex HPX-87K, 300×7.8 mm column, and dextrose as standard, and is provided on a dry solids basis. In certain embodiments as otherwise described herein, the soluble dietary fiber has a DP1+DP2 content of no more than 2.8 wt % on a dry solids basis. For example, in certain embodiments, the DP1+DP2 content is no more than 2.5 wt % on a dry solids basis, e.g., no more than 2.3 wt %. In certain additional embodiments as otherwise described herein, the soluble dietary fiber has a DP1+DP2 content of no more than 2 wt %, e.g., no more than 1.7 wt %. In certain additional embodiments as otherwise described herein, the soluble dietary fiber has a DP1+DP2 content of no more than 1.5 wt %, e.g., no more than 1.2 wt %, or no more than 1.1 wt %. In certain additional embodiments as otherwise described herein, the soluble dietary fiber has a DP1+DP2 content of no more than 1.0 wt %, e.g., no more than 0.8 wt %. In certain additional embodiments as otherwise described herein, the soluble dietary fiber has a DP1+DP2 content of no more than 0.5 wt %. When added before or during fermentation, any remaining fermentable sugars in the soluble dietary fiber can be fermented, e.g., to alcohol.

The individual amounts of DP1 (e.g., monosaccharides) and DP2 materials (e.g., disaccharides) can be important as well as their combined total content. Accordingly, in certain embodiments as otherwise described herein, the soluble dietary fiber has a DP2 content (e.g., a dextrose disaccharide content) of no more than 3 wt % on a dry solids basis, e.g., no more than 2.5 wt %. In certain embodiments as otherwise described herein, the DP2 content (e.g., the dextrose disaccharide content) is no more than 2 wt %, e.g., no more than 1.7 wt %. In certain embodiments as otherwise described herein, the DP2 content (e.g., the dextrose disaccharide content) is no more than 1.5 wt %, e.g., no more than 1.3 wt %. In certain embodiments as otherwise described herein, the DP2 content (e.g., the dextrose disaccharide content) is no more than 1.0 wt %, e.g., no more than 0.75 wt %. In certain embodiments as otherwise described herein, the DP2 content (e.g., the dextrose disaccharide content) is no more than 0.50 wt %.

In certain embodiments as otherwise described herein, the soluble dietary fiber has a DP1 content (e.g., a dextrose content) of no more than 1.0 wt % on a dry solids basis, e.g., no more than 0.75 wt %. In certain embodiments as otherwise described herein, the soluble dietary fiber has a DP1 content (e.g., a dextrose content) of no more than 0.50 wt %, e.g., no more than 0.30 wt %, or no more than 0.20 wt %. In certain embodiments as otherwise described herein, the soluble dietary fiber has a DP1 content (e.g., a dextrose content) of no more than 0.10 wt %, e.g., no more than 0.05 wt %.

Another important attribute of certain embodiments of the present disclosure is a high content of dextrose residues. Notably, the materials of the disclosure can be made to have all or nearly all of the molecular structure (i.e., excluding water) made up of dextrose residues, i.e., either as dextrose monosaccharide or dextrose residues in a DP2+ material. Accordingly, in certain embodiments, the soluble dietary fiber as otherwise described herein has at least 97 wt % dextrose residues on a dry solids basis, e.g., at least 97.5 wt %, at least 98 wt %, or at least 98.5 wt %. That is, at least 97 wt % on a dry solids basis of the material is made up of monomeric dextrose and dextrose residues within a larger molecular structure. In various other additional embodiments as otherwise described herein, the soluble dietary fiber has at least 98.5 wt % dextrose residues, e.g., at least 99 wt %, or at least 99.5 wt %, or at least 99.8 wt %.

Notably, unlike in conventional "polydextrose" products, in certain aspects of the disclosure the soluble dietary fiber does not have substantial amounts of sugar alcohol residues present, either as monomeric sugar alcohols or bound into a larger molecular structure. Desirably, there are substantially no sugar alcohols present. In certain embodiments as otherwise described herein, the soluble dietary fiber has no more than 2 wt % sugar alcohol residues on a dry solids basis, e.g., no more than 1.5 wt % or no more than 1.0 wt %. In certain additional embodiments as otherwise described herein, the soluble dietary fiber has no more than 0.5 wt % sugar alcohol residues on a dry solids basis, e.g., no more than 0.4 wt %, or no more than 0.3 wt %, or no more than 0.2 wt %, or no more than 0.1 wt % sugar alcohol residues. Examples of sugar alcohols include sorbitol, mannitol, xylitol, lactitol, and maltitol.

Notably, certain desirable embodiments of the soluble dietary fiber as otherwise described herein have a relatively low molecular weight. Without intending to be bound by theory, the relatively low molecular weight is believed to advantageously contribute to certain other attributes, such as the rheological properties of the soluble dietary fiber. Notably, the present inventors have provided a soluble dietary fiber that not only has a relatively low molecular weight, but also a high fiber content and a low sugar content as otherwise described herein. In certain especially advantageous embodiments as otherwise described herein, the soluble dietary fiber has a weight-average molecular weight in the range of 1000 g/mol to 2500 g/mol. For example, in various embodiments the weight average molecular weight may be in the range of 1200 g/mol to 2500 g/mol, or 1400 g/mol to 2500 g/mol, or 1500 g/mol to 2500 g/mol, or 1600 g/mol to 2500 g/mol, or 1700 g/mol to 2500 g/mol, or 1800 g/mol to 2500 g/mol, or 1900 g/mol to 2500 g/mol, or 2000 g/mol to 2500 g/mol, or 1200 g/mol to 2400 g/mol, or 1400 g/mol to 2400 g/mol, or 1500 g/mol to 2400 g/mol, or 1600 g/mol to 2400 g/mol, or 1700 g/mol to 2400 g/mol, or 1800 g/mol to 2400 g/mol, or 1900 g/mol to 2400 g/mol, or 1200 g/mol to 2300 g/mol, or 1400 g/mol to 2300 g/mol, or 1500 g/mol to 2300 g/mol, or 1600 g/mol to 2300 g/mol, or 1700 g/mol to 2300 g/mol, or 1800 g/mol to 2300 g/mol, or 1900 g/mol to 2300 g/mol, or 2000 g/mol to 2300 g/mol.

In other embodiments as otherwise described herein, the soluble dietary fiber has a weight-average molecular weight in the range of 1000 g/mol to 3000 g/mol. For example, in various embodiments the weight average molecular weight may be in the range of 1200 g/mol to 3000 g/mol, or 1400 g/mol to 3000 g/mol, or 1500 g/mol to 3000 g/mol, or 1600 g/mol to 3000 g/mol, or 1700 g/mol to 3000 g/mol, or 1800 g/mol to 3000 g/mol, or 1900 g/mol to 3000 g/mol, or 2000 g/mol to 3000 g/mol, or 1200 g/mol to 2750 g/mol, or 1400 g/mol to 2750 g/mol, or 1500 g/mol to 2750 g/mol, or 1600 g/mol to 2750 g/mol, or 1700 g/mol to 2750 g/mol, or 1800 g/mol to 2750 g/mol, or 1900 g/mol to 2750 g/mol, or 2000 g/mol 2750 g/mol.

As used herein, molecular weights of soluble dietary fibers are determined by gel permeation chromatography, using a GPC column set consisting of two Waters Ultrahydrogel 6 micron, 7.8×300 mm, 250 Å and 120 Å pore size columns and an Ultrahydrogel DP guard column 6×40 mm, and narrow molecular weight distribution pullulans as standards.

As described above, in certain embodiments, the low molecular weight of the soluble dietary fibers of the present disclosure is believed to lead to desirable properties. Accordingly, in certain embodiments as otherwise described herein, the soluble dietary fiber has a weight-average molecular weight of no more than 2500 g/mol. For example, in certain embodiments the weight-average molecular weight is no more than 2400 g/mol, or no more than 2300 g/mol.

In certain embodiments as otherwise described herein, the soluble dietary fiber has a weight-average molecular weight of at least 1200 g/mol. For example, in certain embodiments as otherwise described herein, the molecular weight is at least 1300 g/mol, e.g., at least 1400 g/mol. In various additional embodiments as otherwise described herein, the molecular weight is at least 1500 g/mol, e.g., at least 1550 g/mol, or at least 1600 g/mol, or at least 1700 g/mol. In other embodiments as otherwise described herein, the molecular weight is at least 1800 g/mol, e.g., at least 1900 g/mol, or at least 2000 g/mol.

For example, in certain embodiments as otherwise described herein, the soluble dietary fiber has a weight-average molecular weight in the range of 1600 g/mol to 2500 g/mol e.g., in the range of 1600 g/mol to 2400 g/mol, or in the range of 1900 g/mol to 2300 g/mol.

In certain embodiments as otherwise described herein, the soluble dietary fiber has a number-average molecular weight in the range of 1000 g/mol to 2000 g/mol, e.g., in the range of 1200 g/mol to 1900 g/mol, or in the range of 1400 g/mol to 1800 g/mol. Number-average molecular weights are determined as described above for weight-average molecular weights, processing the data to provide the number-average value as is common in the art.

Moreover, in certain embodiments as otherwise described herein, the soluble dietary fiber has a relatively low polydispersity (i.e., the ratio of weight-average molecular to number-average molecular weight). In certain embodiments as otherwise described herein, the polydispersity of the soluble dietary fiber is no more than 1.8, e.g., no more than 1.7, or no more than 1.6. For example, in certain embodiments, the polydispersity is in the range of 1.1 to 1.8, e.g., 1.2 to 1.7, or 1.25 to 1.6.

The linkage pattern of dextrose residues of the soluble dietary fiber can be important to the properties thereof, including, in various embodiments, digestibility, fermentability and rheology. Accordingly, in certain embodiments as otherwise described herein, the soluble dietary fiber has a linkage pattern comprising:

30-45% terminally-linked glucopyranosyl residues;
18-30% 6-linked glucopyranosyl residues;
4-12% 4-linked glucopyranosyl residues;
4-13% 3-linked glucopyranosyl residues;
3-8% 2-linked glucopyranosyl residues;
2-10% 4,6-linked glucopyranosyl residues;
2-7% 3,6-linked glucopyranosyl residues;
up to 4% 3,4-linked glucopyranosyl residues; and
up to 4% 2,4-linked glucopyranosyl residues.

In certain embodiments as otherwise described herein, the soluble dietary fiber has a linkage pattern comprising:

35-43% terminally-linked glucopyranosyl residues;
20-28% 6-linked glucopyranosyl residues;
6-11% 4-linked glucopyranosyl residues;
6-12% 3-linked glucopyranosyl residues;
3-8% 2-linked glucopyranosyl residues;
3-9% 4,6-linked glucopyranosyl residues;
2-7% 3,6-linked glucopyranosyl residues;
up to 3% 3,4-linked glucopyranosyl residues; and
up to 2% 2,4-linked glucopyranosyl residues.

One characteristic parameter for a soluble dietary fiber is the ratio of 6-linked glucopyranosyl residues to 4-linked glucopyranosyl residues. As alpha 1→4 bonds are typically the most susceptible to enzymatic hydrolysis, it can be desirable to have relatively fewer of them. Moreover, different molecular structures can lead to different interactions within the soluble dietary fiber itself as well as with other components in a food or beverage. Different molecular structures will have different molecular shapes, and can provide more or less chain entanglement among the oligosaccharide molecules of the soluble dietary fiber itself, which can provide higher or lower viscosity. And different molecular structures will similarly interact differently with other ingredients in a food or beverage. One example interaction with water; different structures can provide different water activities at the same molecular weight. In certain embodiments as otherwise described herein, the soluble dietary fiber has a ratio of 6-linked glucopyranosyl residues to 4-linked glucopyranosyl residues that is at least 1, e.g., at least 1.5. In certain embodiments, the ratio of 6-linked glucopyranosyl residues to 4-linked glucopyranosyl residues is at least 2, e.g., at least 2.5. In certain embodiments, the ratio of 6-linked glucopyranosyl residues to 4-linked glucopyranosyl residues is at least 3. For example, in certain embodiments, the ratio of 6-linked glucopyranosyl residues to 4-linked glucopyranosyl residues is in the range of 1-4, e.g., in the range of 1.5-4, or 2-4. In certain embodiments, the ratio of 6-linked glucopyranosyl residues to 4-linked glucopyranosyl residues is in the range of 2.5-4, e.g., in the range of 3-4. In certain embodiments, the ratio of 6-linked glucopyranosyl residues to 4-linked glucopyranosyl residues is in the range of 1-3.75, e.g., in the range of 1.5-3.75, or 2-3.75. In certain embodiments, the ratio of 6-linked glucopyranosyl residues to 4-linked glucopyranosyl residues is in the range of 2.5-3.75, e.g., in the range of 3-3.75. In certain embodiments, the ratio of 6-linked glucopyranosyl residues to 4-linked glucopyranosyl residues is in the range of 1-3.5, e.g., in the range of 1.5-3.5, or 2-3.5. In certain embodiments, the ratio of 6-linked glucopyranosyl residues to 4-linked glucopyranosyl residues is in the range of 2.5-3.5, e.g., in the range of 3-3.5.

Linkage patterns are determined using the method of York et al., Methods Enzymol. 116, 3-40 (1985), which is hereby incorporated by reference in its entirety. The method proceeds by permethylating the oligosaccharide, followed by quantitative hydrolysis and acetylation. This results in monomeric species that are acetylated where they were bound to other residues in the oligosaccharide, and methylated everywhere else. The mixture of the monomeric species can be analyzed by gas chromatography to determine relative amounts of different types of linked monomers. All linkages quantified in this disclosure can be determined using this method.

As used herein, a terminal residue is a residue that has only a single linkage to the rest of the oligosaccharide of which is it is a part. A 1,X-linked residue is one that is linked to the rest of the oligosaccharide of which it is a part at through its 1-position and its X-position (i.e., to two other residues). A 1,X,Y-linked residue is one that it is linked to the rest of the oligosaccharide of which it is a part through its 1-position, its X-position, and its Y-position (i.e., to three other residues). As used herein, the term "oligosaccharide" includes disaccharides, trisaccharides, and oligomers of higher degrees of polymerization up to 30. Linkage percentages are provided as the fraction of the total number of terminally-linked residues, di-linked residues and tri-linked residues.

Soluble dietary fibers having the linkage patterns described herein can be advantageously produced using the methods described herein.

In certain embodiments, the soluble dietary fibers described herein can have desirable glass transition temperature. As the person of ordinary skill in the art will appreciate, glass transition temperature will depend on water content. In certain embodiments, the soluble dietary fiber has a glass transition temperature at 70% solids in the range of −20° C. to −50° C., e.g., −30° C. to −42° C. Glass transition temperatures are measured by differential scanning calorimetry with a ramp rate of 10° C. per minute.

Notably, the soluble fiber products of the disclosure can provide relatively low viscosity. Without intending to be bound by theory, the inventors surmise that this is due to the molecular structure of the soluble dietary fiber, including a relatively low amount of high-molecular weight components. In certain embodiments as otherwise described herein, the soluble dietary fiber has a viscosity at 70% DS and 10° C. of no more than 55000 cP, for example, no more than 50000 cP, or no more than 45000 cP. For example, in certain embodiments, the soluble dietary fiber has a viscosity at 70% DS and 10° C. in the range of 30000-55000 cP, e.g., 30000-50000 cP, or 30000-45000 cP, or 35000-55000 cP, or 35000-50000 cP, or 35000-45000 cP, or 40000-55000 cP, or 40000-50000 cP, or 40000-45000 cP. Viscosities were measured using a stress control (DHR-3) rheometer from TA Instruments, equipped with a lower Peltier plate and an upper parallel plate (40 mm diameter). The upper parallel plate geometry was that of a previous generation of rheometer (AR-2000); in order to make it compatible with the DHR-3 rheometer, a drawdown rod and an adaptor were used. Flow cures at shear rates from 500 $s^{-1}$ to 0.5 $s^{-1}$ can be performed under the same temperature steps, 20° C., 40° C. and 60° C.

The soluble dietary fibers described herein can be made using methods analogous to those in U.S. Patent Application Publication nos. 2012/0034366, e.g., using methods generally described in U.S. Pat. No. 7,608,436, each of which is hereby incorporated herein by reference in its entirety.

Soluble dietary fibers are often used to modify the texture, thickness, mouthfeel, body or other physical aspects of a food or beverage product. As described above, the soluble dietary fibers of the present disclosure are well-suited for use in fermented beverages, e.g., beer. Accordingly, another aspect of the disclosure is a method of improving body in a fermented beverage, the method including providing a soluble dietary fiber as otherwise described herein in the fermented beverage. In certain embodiments as otherwise described herein, providing the soluble dietary fiber in the fermented beverage includes providing a fermented beverage and combining the soluble dietary fiber in the fermented beverage. As such, another aspect of the disclosure is a fermented beverage comprising a soluble dietary fiber as otherwise described herein.

One advantage of the soluble dietary fiber of the present invention is its low sugar content and relative resistance for enzymatic breakdown, including during fermentation. As such, soluble dietary fiber as otherwise described herein may be added prior to a fermentation step. Accordingly, in certain embodiments as otherwise described herein, providing the soluble dietary fiber in the fermented beverage includes providing a fermentable wort, combining the soluble dietary fiber with the fermentable wort, and fermenting the fermentable wort including the soluble dietary fiber to provide the fermented beverage. Alternatively, in various other embodiments, providing the soluble dietary fiber in the fermented beverage includes providing a mash by combining grains and water, including the soluble dietary fiber in the mash, collecting a fermentable wort including the soluble dietary fiber from the mash, and fermenting the fermentable wort to provide the fermented beverage.

It will be understood that the soluble dietary fiber of the present invention can be provided in a number of fermented beverages. In certain embodiments as otherwise described herein, the fermented beverage is a beer (e.g., an ale or a lager). In various other embodiments, the fermented beverage is a cider, a mead, a wine, a rice wine, a sake, a kombucha or a sauerkraut juice. Suitable fermented beverages can be filtered or unfiltered, and can be pasteurized as well as unpasteurized. Notably, the soluble dietary fibers described herein can be especially useful in unfiltered and unpasteurized beverages, in that they can be resistant to fermentation by any residual yeast present.

In certain embodiments, the fermented beverage contains alcohol. For example, the fermented beverage may contain ethanol. In certain embodiments as otherwise described herein, the fermented beverage contains no more than 20 vol % ethanol, or no more than 15 vol % ethanol, or no more than 8 vol % ethanol. In various other embodiments as otherwise described herein, the fermented beverage has been treated to remove alcohol. Various methods to remove alcohol are known in the art, including evaporative processes (e.g., vacuum distillation) and/or reverse osmosis. Accordingly, in certain embodiments as otherwise described herein, the fermented beverage contains no more than 1.2 vol % ethanol (e.g., ethanol), or no more than 1.0 vol % ethanol, or no more than 0.75 vol % ethanol, or no more than 0.5 vol % ethanol, or no more than 0.2 vol % ethanol. In various embodiments as otherwise described herein, the fermented beverage contains between 0.10 vol % and 1.2 vol % ethanol. For example, the fermented beverage may contain between 0.2 vol % and 1.20 vol % ethanol, or between 0.5 vol % and 1.2 vol % ethanol, or between 0.5 vol % and 1.0 vol % ethanol. In certain other embodiments as otherwise described herein, the fermented beverage contains essentially no alcohol, e.g., no more than 0.2 vol % ethanol, or no more than 0.10 vol % ethanol, or no more than 0.05 vol % ethanol.

Another aspect of the disclosure is a method for making a food or beverage product, the method comprising (i) providing a soluble dietary fiber as otherwise described herein; and (ii) combining the soluble dietary fiber with one or more other food or beverage ingredients. The food or beverage product comprising the soluble dietary fiber as otherwise described herein may also be fermented or cultured.

A variety of food and beverage products can benefit from the addition of the soluble dietary fiber of the present invention. In certain embodiments, the food or beverage product may be a spirit, a liqueur or a spirit alternative (e.g., low-alcohol or low-calorie spirit). In certain other embodiments the food or beverage product is a cocktail or mixed drink, e.g., a margarita, old-fashioned, mulled wine or egg nog. The soluble dietary fiber may also be included in powdered or concentrated mixes wherein the consumer creates the final product. Accordingly, in further embodiments as otherwise described herein, the food or beverage product is a mix such as a cocktail mix (e.g., margarita mix) or hot chocolate mix.

The soluble dietary fibers described herein can be useful for Keto products or low/no digestible carbohydrate-based products, due to their very high levels of dietary fiber and low levels of digestible sugars. One disadvantage of conventional Keto diets is the lack of carbohydrates believed to be essential in a regular diet. Fortification with the soluble dietary fibers described herein can allow for the addition of fiber desirable for digestive health and microbiome support to balance out the protein consumption without adding a significant amount of digestible sugars.

The soluble dietary fibers described herein can be useful for sports nutrition, due to their very high levels of dietary fiber and low levels of digestible sugars. Products in the sports nutrition category require targeted amounts of nutrients per serving, low/no sugars, low digestible carbohydrates etc. Fortification with the soluble dietary fibers described herein can allow for the addition of fiber desirable for digestive health and microbiome support without adding a significant amount of digestible sugars.

In various other embodiments, the food or beverage product is a dairy product. For example, the food or beverage product is a dairy drink, dairy drink with added fruit or cereal grains, dairy-based smoothie, yogurt, kefir, drinkable yogurt, long shelf life yogurt, dairy-based meal replacement drink, dairy-based drink mix, quark, ice cream or egg nog. In various other embodiments, the food or beverage product is a dairy alternative, e.g., nut milk, oat milk, dairy-free beverage mix, cereal or grain drink, almond milk, rice milk, cashew milk, soy milk, hemp milk or coconut milk. The soluble dietary fiber as otherwise described herein can provide fiber fortification and potentially allow for the provision of low/no/reduced sugar beverages, while providing enhanced mouthfeel in such beverages, especially in the case of nut and seed milks which often can suffer from a thin mouthfeel. Enhanced digestive health, weight management, and increase in satiety can also be provided through the use of the soluble dietary fibers described herein.

In certain embodiments as otherwise described here, the food or beverage product is a juice or fruit/vegetable drink (e.g., fruit juice, concentrated juice mix, vegetable juice, vegetable juice mix, blended juice, fruit or vegetable puree or coulis). In further embodiments, the food or beverage product is a water, e.g., flavored water, unflavored water, sparkling water, carbonated water, flavored water mix or sparkling water mix.

The soluble dietary fibers described herein can also be used in tea and coffee drinks. Here, too, the soluble dietary fibers described herein can provide enhanced mouthfeel, together with low/no/reduced sugar and enhanced digestive health. Suitable products include, for example, tea or coffee drink mix, textured tea or textured coffee, a tea or coffee for enhanced digestive health, cold brew coffee, prepackaged coffee or tea drinks.

In various other embodiments as otherwise described herein, the food or beverage product is a coarse grain food or beverage product, e.g., beverage made with coarse grains, coarse grain drink mix, coarse grain drink combined with juice or dairy drink or coffee drink or tea drink or fermented drink. The food or beverage product can also be a slimming beverage or meal replacement beverage.

In certain embodiments, the food or beverage product is a bar (e.g., a snack bar), for example, a meal replacement bar, a nutrition bar, a granola bar, a cereal bar, a grain bar, a protein bar or a nut bar. In various other embodiments, the food or beverage product is a granola, a muesli, a topping, a coating, a baked good (e.g., cookie, a biscuit, a bread, a pastry, a pizza crust, a flatbread), a bar (e.g., snack bar, cereal bar, granola bar, energy bar), a meat alternative, a filling (e.g., a fruit filling or a crème filling), a fruit snack such as a fruit leather, a pasta, a sweetener, a frozen dessert, a dairy product (e.g., a yogurt, a quark, an ice cream), a dairy alternative product (e.g. yoghurt alternative), a glaze, a frosting, a syrup, a pet food, a medical food, a flavoring or a dry blend.

A soluble dietary fiber as described herein can be used in food or beverage products in combination with bulking agents, such as sugar alcohols or maltodextrins, to reduce caloric content and/or to enhance nutritional profile of the product. A soluble dietary fiber as described herein can also be used as a partial replacement for fat in food or beverage products.

A soluble dietary fiber as described herein can be used in food or beverage products as a tenderizer or texturizer, to increase crispness or snap, to improve eye appeal, and/or to improve the rheology of dough, batter, or other food compositions. A soluble dietary fiber as described herein can also be used in food products as a humectant, to increase product shelf life, and/or to produce a softer, moister texture. It can also be used in food products to reduce water activity or to immobilize and manage water. Additional uses of the oligomer composition as described herein include: to replace egg wash and/or to enhance the surface sheen of a food product, to alter flour starch gelatinization temperature, to modify the texture of the product, and to enhance browning of the product.

At least in some embodiments of the invention, a soluble dietary fiber as described herein has one or more of the following advantages: high solubility, which makes it relatively easy to incorporate into food compositions, such as batters and doughs; stability under elevated temperatures and/or acidic pH (some other soluble fibers, such as inulin, are not as stable), lower sweetness, clean flavor, and clear color. The properties of a soluble dietary fiber as described herein can allow food or beverage products in which it is used to have a so-called "clean label."

A soluble dietary fiber as described herein can be used in a variety of types of food or beverage products. One type of food product in which a soluble dietary fiber as described herein can be very useful is bakery products (i.e., baked foods), such as cakes, cheesecakes, baked mousses, brownies, cookies, cookie crisps, muffins, breads, and sweet doughs. Conventional bakery products can be relatively high in sugar and high in total carbohydrates. The use of a soluble dietary fiber as described herein as an ingredient in bakery products can help lower the sugar and carbohydrate levels, as well as reduce the total calories, while increasing the fiber content of the bakery product.

There are two main categories of bakery products: yeast-raised and chemically-leavened. In yeast-raised products, like donuts, sweet doughs, and breads, a soluble dietary fiber as described herein can be used to replace sugars, but a small amount of sugar may still be desired due to the need for a fermentation substrate for the yeast or for crust browning. A soluble dietary fiber as described herein in solid form could be added in a manner similar to nutritive dry sweeteners, with other dry ingredients, and would require no special handling. A soluble dietary fiber as described herein can be added with other liquids as a direct replacement for syrups or liquid sweeteners. The dough would then be processed under conditions commonly used in the baking industry including being mixed, fermented, divided, formed or extruded into loaves or shapes, proofed, and baked or fried. The product can be baked or fried using conditions similar to traditional products. Breads are commonly baked at temperatures ranging from 420° F. to 520° F. for 20 to 23 minutes and doughnuts can be fried at temperatures ranging from 400-415° F., although other temperatures and times could also be used. High intensity sweeteners can be added to doughs as required to obtain optimum sweetness and flavor profile.

Chemically leavened products typically have more sugar and may contain have a higher level of a soluble dietary fiber as described herein. A finished cookie can contain 30% sugar, which could be replaced, entirely or partially, with a soluble dietary fiber as described herein. These products could have a pH of 4-9.5, for example. The moisture content can be between 2-40%, for example.

A soluble dietary fiber as described herein is readily incorporated and may be added to the fat at the beginning of mixing during a creaming step or in any method similar to the syrup or dry sweetener that it is being used to replace. The product would be mixed and then formed, for example by being sheeted, rotary cut, wire cut, or through another forming process. The products would then be baked under typical baking conditions, for example at 200-450° F.

A soluble dietary fiber as described herein can also be used to form sugar glasses in the amorphous state, to adhere particles to baked goods, and/or used to form a film or coating which enhances the appearance of a baked good. A soluble dietary fiber as described herein in solid form, like other amorphous sugars, form glasses with heating and subsequent cooling to a temperature below their glass transition temperature.

Another type of food or beverage product in which a soluble dietary fiber as described herein can be used is breakfast cereal. For example, a soluble dietary fiber as described herein could be used to replace all or part of the sugar in extruded cereal pieces and/or in the coating on the outside of those pieces. The coating is typically 30-60% of the total weight of the finished cereal piece. A soluble dietary fiber as described herein can be applied in a spray or drizzled on, for example. The formula for the coating can be as simple as a 75% solution of a soluble dietary fiber as described herein. A soluble dietary fiber as described herein could also be blended with sugar at various percentages, or with other sweeteners or polyols. The extra moisture could then be evaporated in a low heat oven. In an extruded piece, a soluble dietary fiber as described herein in solid form could be added directly with the dry ingredients, or a soluble dietary fiber as described herein in syrup form could be metered into the extruder with water or separately. A small amount of water could be added in the extruder, and then it could pass through various zones ranging from 100° F. to 300° F. Optionally, other sources of fiber such as resistant starch can be used in the extruded piece. Using a soluble dietary fiber as described herein would create a different texture than other fiber sources. Using it alone or in combination with other fibers may alter the texture to create product diversity.

Another type of food product in which a soluble dietary fiber as described herein can be used is confections. Examples of confections in which it can be used include hard candies, fondants, nougats and marshmallows, gelatin jelly candies or gummies, jellies, wine gums, chocolate, liquor chocolates, chocolates and confectionary items with liquor fillings, confectionery coating, licorice, chewing gum, caramels and toffees, chews, mints, tableted confections, hard-panned and soft panned products, and fruit snacks. In fruit snacks, a soluble dietary fiber as described herein could be used in combination with fruit juice. The fruit juice would provide the majority of the sweetness, and the soluble dietary fiber as described herein would reduce the total sugar content and add fiber. The syrup can be added to the initial candy slurry and heated to the finished solids content. The slurry could be heated from 200-305° F. to achieve the finished solids content. Acid could be added before or after heating to give a finished pH of 2-7. A soluble dietary fiber as described herein could be used as a replacement for 0-100% of the sugar and 1-100% of the corn syrup or other sweeteners (e.g., tapioca syrup, pea syrup) present.

Another type of food product in which a soluble dietary fiber as described herein can be used is spreads, such as nut-based spreads. Examples include highly sweetened spreads such as sweetened hazelnut spreads (e.g., NUTELLA); and nut butters such as peanut butter, almond butter and cashew butter, which are often sweetened (albeit to a lower degree than NUTELLA). Of course, soluble dietary fiber can be used as described herein even in unsweetened nut butters. The use of soluble dietary fiber can provide enhanced sweetness and/or flavor as described herein, and can also provide desirable texture to the spread.

Another type of food product in which a soluble dietary fiber as described herein can be used is jams and jellies. Jams and jellies are made from fruit. A jam contains fruit pieces, while jelly is made from fruit juice. A soluble dietary fiber as described herein can be used in place of sugar or other sweeteners as follows: Weigh fruit and juice into a tank. Premix sugar, resistant corn syrup and pectin. Add the dry composition to the liquid and cook to a temperature of 214-220° F. Hot fill into jars and retort for 5-30 minutes.

Another type of food product in which a soluble dietary fiber as described herein can be used is high solids fillings. Examples of high solids fillings in which it can be used include fillings in snack bars, toaster pastries, donuts, and cookies. The high solids filling could be an acid/fruit filling or a savory filling, for example. It could be added to products that would be consumed as is, or products that would undergo further processing, by a food processor (additional baking) or by a consumer (bake stable filling). In some embodiments, the high solids fillings would have a solids concentration between 67-90%. The solids could be entirely replaced with a soluble dietary fiber as described herein, or it could be used for a partial replacement of the other sweetener solids present (e.g., replacement of current solids from 5-100%). Typically fruit fillings would have a pH of 2-6, while savory fillings would be between 4-8 pH. Fillings could be prepared cold, or heated at up to 250° F. to evaporate to the desired finished solids content.

Another type of food product in which a soluble dietary fiber as described herein can be used is extruded and sheeted snacks. Examples of extruded and sheeted snacks in which it can be used include puffed snacks, crackers, tortilla chips, and corn chips. In preparing an extruded piece, a soluble dietary fiber as described herein (e.g., in solid form) would be added directly with the dry products. A small amount of water would be added in the extruder, and then it would pass through various zones ranging from 100° F. to 300° F. A soluble dietary fiber as described herein could be added at levels from 0-50% of the dry products mixture. A soluble dietary fiber as described herein in liquid form could also be added at one of the liquid ports along the extruder. The product would come out at either a low moisture content (5%) and then baked to remove the excess moisture, or at a slightly higher moisture content (10%) and then fried to remove moisture and cook out the product. Baking could be at temperatures up to 500° F. for 20 minutes. Baking would more typically be at 350° F. for 10 minutes. Frying would typically be at 350° F. for 2-5 minutes. In a sheeted snack, the resistant corn syrup solids could be used as a partial replacement of the other dry ingredients (e.g., flour). It could be from 0-50% of the dry weight. The product would be dry mixed, and then water added to form cohesive dough. The product mix could have a pH from 5 to 8. The dough would then be sheeted and cut and then baked or fried. Baking could be at temperatures up to 500° F. for 20 minutes. Frying would typically be at 350° F. for 2-5 minutes. Another potential benefit from the use of a soluble dietary fiber as described herein is a reduction of the fat content of fried snacks by as much as 15% when it is added as an internal ingredient or as a coating on the outside of a fried food.

Another type of food product in which a soluble dietary fiber as described herein can be used is gelatin desserts. The ingredients for gelatin desserts are often sold as a dry mix with gelatin as a gelling agent. The sugar solids could be replaced partially or entirely with a soluble dietary fiber as described herein in solid form in the dry mix. The dry mix can then be mixed with water and heated to 212° F. to dissolve the gelatin and then more water and/or fruit can be added to complete the gelatin dessert. The gelatin is then allowed to cool and set. Gelatin can also be sold in shelf stable packs. In that case the stabilizer is usually carrageenan-based. As stated above, a soluble dietary fiber as described herein can replace up to 100% of the other sweetener solids. The dry ingredients are mixed into the liquids and then pasteurized and put into cups and allowed to cool and set. The cups usually have a foil top.

Another type of food product in which a soluble dietary fiber as described herein can be used is cheese, cheese sauces, and other cheese products, as well as their dairy alternative versions. Examples of cheese, cheese sauces, and other cheese and dairy alternative products in which it can be used include lower milk solids cheese, lower fat cheese, and calorie reduced cheese. In block cheese, it can help to improve the melting characteristics, or to decrease the effect of the melt limitation added by other ingredients such as starch. It could also be used in cheese sauces, for example as a bulking agent, to replace fat, milk solids, or other typical bulking agents.

Another type of food product in which a soluble dietary fiber as described herein can be used is films that are edible and/or water soluble. Examples of films in which it can be used include films that are used to enclose dry mixes for a variety of foods and beverages that are intended to be dissolved in water, or films that are used to deliver color or flavors such as a spice film that is added to a food after cooking while still hot. Other film applications include, but are not limited to, fruit and vegetable leathers, and other flexible films.

Another type of food product in which a soluble dietary fiber as described herein can be used is soups, syrups, sauces, and dressings. A typical dressing could be from 0-50% oil, with a pH range of 2-7. It could be cold processed or heat processed. It would be mixed, and then stabilizer would be added. A soluble dietary fiber as described herein could easily be added in liquid or dry form with the other ingredients as needed. The dressing composition may need to be heated to activate the stabilizer. Typical heating conditions would be from 170-200° F. for 1-30 minutes. After cooling, the oil is added to make a pre-emulsion. The product is then emulsified using a homogenizer, colloid mill, or other high shear process.

Sauces can have from 0-10% oil and from 10-50% total solids, and can have a pH from 2-8. Sauces can be cold processed or heat processed. The ingredients are mixed and then heat processed. A soluble dietary fiber as described herein could easily be added in liquid or dry form with the other ingredients as needed. Typical heating would be from 170-200° F. for 1-30 minutes.

Soups are more typically 20-50% solids and in a more neutral pH range (4-8). They can be a dry mix, to which a soluble dietary fiber as described herein in solid form could be added, or a liquid soup which is canned and then retorted. In soups, a soluble dietary fiber as described herein could be used up to 50% solids, though a more typical usage would be to deliver 5 g of fiber/serving.

Another type of food product in which a soluble dietary fiber as described herein can be used is coffee creamers. Examples of coffee creamers in which it can be used include both liquid and dry creamers. A dry blended coffee creamer can be blended with commercial creamer powders of the following fat types: soybean, coconut, palm, sunflower, or canola oil, or butterfat. These fats can be non-hydrogenated or hydrogenated. A soluble dietary fiber as described herein in solid form can be added as a fiber source, optionally together with fructo-oligosaccharides, polydextrose, inulin, maltodextrin, resistant starch, sucrose, and/or conventional corn syrup solids. The composition can also contain high intensity sweeteners, such as sucralose, acesulfame potassium, aspartame, or combinations thereof. These ingredients can be dry blended to produce the desired composition.

A spray dried creamer powder is a combination of fat, protein and carbohydrates, emulsifiers, emulsifying salts, sweeteners, and anti-caking agents. The fat source can be one or more of soybean, coconut, palm, sunflower, or canola oil, or butterfat. The protein can be sodium or calcium caseinates, milk proteins, whey proteins, wheat proteins, or soy proteins. The carbohydrate can be a soluble dietary fiber as described herein alone or in combination with fructo-oligosaccharides, polydextrose, inulin, resistant starch, maltodextrin, sucrose, or corn syrup. The emulsifiers can be mono- and diglycerides, acetylated mono- and diglycerides, or propylene glycol monoesters. The salts can be trisodium citrate, monosodium phosphate, disodium phosphate, trisodium phosphate, tetrasodium pyrophosphate, monopotassium phosphate, and/or dipotassium phosphate. The composition can also contain high intensity sweeteners, such as sucralose, acesulfame potassium, aspartame, or combinations thereof. Suitable anti-caking agents include sodium silicoaluminates or silica dioxides. The products are combined in slurry, optionally homogenized, and spray dried in either a granular or agglomerated form.

Liquid coffee creamers are simply a homogenized and pasteurized emulsion of fat (either dairy fat or hydrogenated vegetable oil), some milk solids or caseinates, corn syrup, and vanilla or other flavors, as well as a stabilizing blend. The product is usually pasteurized via HTST (high temperature short time) at 185° F. for 30 seconds, or UHT (ultra-high temperature), at 285° F. for 4 seconds, and homogenized in a two stage homogenizer at 500-3000 psi first stage, and 200-1000 psi second stage. The coffee creamer is usually stabilized so that it does not break down when added to the coffee.

Another type of food product in which a soluble dietary fiber as described herein can be used is food coatings such as icings, frostings, and glazes. In icings and frostings, a soluble dietary fiber as described herein can be used as a sweetener replacement (complete or partial) to lower caloric content and increase fiber content. Glazes are typically about 70-90% sugar, with most of the rest being water, and a soluble dietary fiber as described herein can be used to entirely or partially replace the sugar. Frosting typically contains about 2-40% of a liquid/solid fat combination, about 20-75% sweetener solids, color, flavor, and water. A soluble dietary fiber as described herein can be used to replace all or part of the sweetener solids, or as a bulking agent in lower fat systems.

Another type of food product in which a soluble dietary fiber as described herein can be used is pet food, such as dry or moist dog food. Pet foods are made in a variety of ways, such as extrusion, forming, and formulating as gravies. A soluble dietary fiber as described herein could be used at levels of 0-50% in each of these types.

Another type of food product in which a soluble dietary fiber as described herein can be used is tortillas, which usually contain flour and/or corn meal, fat, water, salt, and fumaric acid. A soluble dietary fiber as described herein could be used to replace flour or fat. The ingredients are mixed and then sheeted or stamped and cooked. This addition could be used to add fiber or extend the shelf life.

Another type of food product in which a soluble dietary fiber as described herein can be used is fish and meat. Conventional corn syrup is already used in some meats, so a soluble dietary fiber as described herein can be used as a partial or complete substitute. For example, a soluble dietary fiber as described herein could be added to brine before it is vacuum tumbled or injected into the meat. It could be added with salt and phosphates, and optionally with water binding ingredients such as starch, carrageenan, or soy proteins. This would be used to add fiber, a typical level would be 5 g/serving which would allow a claim of excellent source of fiber.

Another type of food product in which a soluble dietary fiber as described herein can be used is dried fish and meat snacks such as jerky. Ingredients such as conventional corn syrup, honey, sugar, agave are conventionally used in dried meat snacks to add weight. So a soluble dietary fiber as described herein can be used as a partial or complete substitute for such materials, to provide lower sugar and higher fiber to the product.

Another type of food product in which a soluble dietary fiber as described herein can be used is a meat analogue or meat alternative. Meat analogues and meat alternatives are food products used as meat substitutes and include plant-based ingredients. Meat analogs and meat alternatives can be formed without the use of animal-based ingredients, or alternatively can be made by combining animal-based ingredients with plant-based ingredients (e.g., proteins, fibers, and/or fats). Examples include texturized vegetable protein, tempeh, seitan and pea protein-based foods, as well as animal flesh analogs of the types made by Impossible Foods and Beyond Meat. Soluble dietary fiber as described above may be introduced as a modifier to any of flavor, texture and/or nutrition. For example, soluble dietary fiber may be added to texturized protein products to be used as ingredients in meat analogues, addition may be into the mass that is extruded to create the texturized protein, or after the mass has been extruded. Soluble dietary fiber may be added in a meat analogue with or without texturized protein, and it may be added pre- or post-extrusion of the meat analogue mass, or pre- or post-blending or mixing of ingredients in the composition, or pre- or post-processing. Soluble dietary fiber as described above may be homogenously dispersed throughout the product or concentrated in particular aspects of the product, for example in aspects intended to mimic animal-based components such as muscle meat, cartilage, connective and/or adipose tissue.

Another type of food product in which a soluble dietary fiber as described herein can be used is dried (infused) fruit. Many kinds of dried fruit are only stable and palatable if they are infused with sugar. A soluble dietary fiber as described herein can be substituted for all or part of the sugar. For example, a soluble dietary fiber as described herein could be added to the brine used to infuse the fruit before drying. Stabilizing agents such as sulfates can be used in this brine as well.

Another type of food product in which a soluble dietary fiber as described herein can be used is infant and toddler food. A soluble dietary fiber as described herein could be used as a replacement or a supplement to one or more conventional ingredients for such food. Because of its mild flavor and clear color, it could be added to a variety of baby foods to reduce sugar and increase fiber content.

Another type of food product in which a soluble dietary fiber as described herein can be used is batters and breadings, such as the batters and breadings for meat. This could be done by replacing all or part of the dry components of the batter and/or breading (e.g., flour type ingredients) with a soluble dietary fiber as described herein, or to use in combination with addition to the meat muscle or fried food itself. This could be used as a bulking agent, for fiber addition, or to reduce fat in the fried food.

Food products as disclosed herein can be used to help control the blood glucose concentration in mammals, such as humans, that suffer from diabetes. When the food product is consumed by the mammal, a soluble dietary fiber as described herein in the food product can cause a more moderate relative glycemic response in the bloodstream (i.e. as opposed to similar food products containing corn syrup), which can be beneficial for diabetes patients. "Control" in this context should be understood as a relative term; i.e., the glycemic response can be improved relative to that occurring when the same mammal consumes a similar food product that contains corn syrup, although the glycemic response may not necessarily be equivalent to what would be observed in a mammal that does not suffer from diabetes, or in a mammal that does not eat a food product at all.

An example soluble dietary fiber has a weight-average molecular weight of the fractionated composition of 2298 g/mol as determined by gel permeation chromatography. The number-average molecular weight is 1650 g/mol. The soluble dietary fiber had a DP3+ content of 99.29 wt %, a DP2 content of 0.23 wt %, a DP1 content of 0.00 wt %. No sorbitol was detected in the product. There was about 0.48 wt % 1,6-levoglucosan. The fiber content as measured by AOAC 2001.03 was 105.82% on a dry solids basis. This can be compared to a comparative commercial soluble dietary fiber product, having a weight-average molecular weight of 2659 g/mol, a number average molecular weight of 1402 g/mol, and a fiber content (AOAC 2001.03) of 104.23% on a dry solids basis.

The example soluble dietary fiber had a linkage pattern comprising:
37.2% terminally-linked glucopyranosyl residues;
26.6% 6-linked glucopyranosyl residues;
7.9% 4-linked glucopyranosyl residues;
9.4% 3-linked glucopyranosyl residues;
6.6% 2-linked glucopyranosyl residues;
6.6% 4,6-linked glucopyranosyl residues;
3.8% 3,6-linked glucopyranosyl residues;
1.4% 3,4-linked glucopyranosyl residues; and
0.5% 2,4-linked glucopyranosyl residues.

Notably, the example soluble dietary fiber had a ratio of 6-linked glucopyranosyl residues to 4-linked glucopyranosyl residues of about 3.37. The comparative commercial fiber, in contrast, had a ratio of 6-linked glucopyranosyl residues to 4-linked glucopyranosyl residues of about 0.36.

At 70% solids, the example soluble dietary fiber had a glass transition temperature as measured by differential scanning calorimetry of about −36° C. In contrast, the comparative commercial soluble fiber at 70% solids had a glass transition temperature of about −38° C.

Viscosity data are provided in the table below, and are reported at 10° C., 15° C., and 20° C. Viscosities were measured using a stress control (DHR-3) rheometer from TA Instruments, equipped with a lower Peltier plate and an upper parallel plate (40 mm diameter). The upper parallel plate geometry was that of a previous generation of rheometer (AR-2000); in order to make it compatible with the DHR-3 rheometer, a drawdown rod and an adaptor were used. Flow curves at shear rates from 500 s-1 to 0.5 s-1 can be performed at various temperature conditions.

| | Soluble dietary fiber of the disclosure | Comparative commercial soluble fiber |
|---|---|---|
| Viscosity, cP (10° C.) | 41106 | 65845 |
| Viscosity, cP (15° C.) | 25086 | 38469 |
| Viscosity, cP (20° C.) | 15569 | 22891 |

The example soluble dietary fiber had a water activity of about 0.893 at 70% solids, as measured by an Aqualab Series 4 from Meter Group, Inc. In contrast, the comparative commercial soluble fiber had a water activity of about 0.883 at 70% solids.

Additional aspects of the disclosure are provided by the following enumerated embodiments, which may be combined in any number and in any combination not technically or logically inconsistent.

Embodiment 1. A soluble dietary fiber having a fiber content of at least 97% as measured by AOAC 2001.03 and a combined DP1+DP2 content of no more than 3 wt % on a dry solids basis.

Embodiment 2. A soluble dietary fiber according to embodiment 1 having a fiber content of at least 98%.

Embodiment 3. A soluble dietary fiber according to embodiment 1 having a fiber content of at least 99%.

Embodiment 4. A soluble dietary fiber according to embodiment 1, having a fiber content in the range of 97% to 110%.

Embodiment 5. A soluble dietary fiber according to embodiment 1, having a fiber content in the range of 98% to 110%, e.g., 99% to 110%.

Embodiment 6. A soluble dietary fiber according to embodiment 1, having a fiber content of 97% to 108%, e.g., 97% to 106%, or 97% to 103%, or 97% to 100%.

Embodiment 7. A soluble dietary fiber according to embodiment 1, having a fiber content of 98% to 108%, e.g., 98% to 106%, or 98% to 103%, or 98% to 100%.

Embodiment 8. A soluble dietary fiber according to embodiment 1, having a fiber content of 99% to 108%, e.g., 99% to 106%, or 99% to 103%, or 99% to 100%.

Embodiment 9. A soluble dietary fiber according to any of embodiments 1-8, having a DP1+DP2 content of no more than 2.8 wt % on a dry solids basis.

Embodiment 10. A soluble dietary fiber according to any of embodiments 1-8, having a DP1+DP2 content of no more than 2.5 wt % on a dry solids basis, e.g., no more than 2.3 wt %.

Embodiment 11. A soluble dietary fiber according to any of embodiments 1-8, having a DP1+DP2 content of no more than 2 wt % on a dry solids basis, e.g., no more than 1.7 wt %.

Embodiment 12. A soluble dietary fiber according to any of embodiments 1-8, having a DP1+DP2 content of no more than 1.5 wt % on a dry solids basis, e.g., no more than 1.2 wt %, or no more than 1.1 wt %.

Embodiment 13. A soluble dietary fiber according to any of embodiments 1-8, having a DP1+DP2 content of no more than 1.0 wt % on a dry solids basis, e.g., no more than 0.8 wt %.

Embodiment 14. A soluble dietary fiber according to any of embodiments 1-8, having a DP1+DP2 content of no more than 0.5 wt % on a dry solids basis.

Embodiment 15. A soluble dietary fiber according to any of embodiments 1-14, having a DP2 content of no more than 3 wt % on a dry solids basis, e.g., no more than 2.5 wt %.

Embodiment 16. A soluble dietary fiber according to any of embodiments 1-14, having a DP2 content of no more than 2 wt % on a dry solids basis, e.g., no more than 1.7 wt %.

Embodiment 17. A soluble dietary fiber according to any of embodiments 1-14, having a DP2 content of no more than 1.5 wt % on a dry solids basis, e.g., no more than 1.3 wt %.

Embodiment 18. A soluble dietary fiber according to any of embodiments 1-14, having a DP2 content of no more than 1.0 wt % on a dry solids basis, e.g., no more than 0.75 wt %.

Embodiment 19. A soluble dietary fiber according to any of embodiments 1-14, having a DP2 content of no more than 0.5 wt % on a dry solids basis.

Embodiment 20. A soluble dietary fiber according to any of embodiments 1-19, having a DP1 content of no more than 1.0 wt % on a dry solids basis, e.g., no more than 0.75 wt %.

Embodiment 21. A soluble dietary fiber according to any of embodiments 1-19, having a DP1 content of no more than 0.50 wt % on a dry solids basis, e.g., no more than 0.30 wt %, or no more than 0.20 wt %.

Embodiment 22. A soluble dietary fiber according to any of embodiments 1-19, having a DP1 content of no more than 0.10% wt % on a dry solids basis %, e.g., no more than 0.05 wt %.

Embodiment 23. A soluble dietary fiber according to any of embodiments 1-22, having at least 97 wt % dextrose residues (e.g., at least 97.5 wt %, at least 98 wt %, or at least 98.5 wt % dextrose residues) on a dry solids basis.

Embodiment 24. A soluble dietary fiber according to any of embodiments 1-22, having at least 99 wt % dextrose residues (e.g., at least 99.5 wt %, or at least 99.8 wt % dextrose residues) on a dry solids basis.

Embodiment 25. A soluble dietary fiber according to any of embodiments 1-24, having no more than 1 wt % sugar alcohol residues on a dry solids basis.

Embodiment 26. A soluble dietary fiber according to any of embodiments 1-24, having no more than 0.5 wt % sugar alcohol residues on a dry solids basis.

Embodiment 27. A soluble dietary fiber according to any of embodiments 1-24, having no more than 0.2 wt % on a dry solids basis, e.g., no more than 0.1 wt % sugar alcohol residues.

Embodiment 28. A soluble dietary fiber according to any of embodiments 1-27, wherein the soluble dietary fiber has a weight-average molecular weight in the range of 1000 g/mol to 2500 g/mol.

Embodiment 29. A soluble dietary fiber according to any of embodiments 1-28, wherein the soluble dietary fiber has a weight-average molecular weight of no more than 2500 g/mol, e.g., no more than 2400 g/mol, or no more than 2300 g/mol.

Embodiment 30. A soluble dietary fiber according to any of embodiments 1-28, wherein the soluble dietary fiber has a weight-average molecular weight of no more than 3000 g/mol, e.g., no more than 2750 g/mol.

Embodiment 31. A soluble dietary fiber according to any of embodiments 1-30, wherein the soluble dietary fiber has a weight-average molecular of at least 1200 g/mol, e.g., at least 1300 g/mol, or at least 1400 g/mol.

Embodiment 32. A soluble dietary fiber according to any of embodiments 1-31, wherein the soluble dietary fiber has a weight-average molecular of at least 1500 g/mol, e.g., at least 1550 g/mol, or at least 1600 g/mol, or at least 1700 g/mol.

Embodiment 33. A soluble dietary fiber according to any of embodiments 1-30, wherein the soluble dietary fiber has a weight-average molecular of at least 1800 g/mol, e.g., at least 1900 g/mol, or at least 2000 g/mol.

Embodiment 34. A soluble dietary fiber according to any of embodiments 1-27, wherein the soluble dietary fiber has a weight-average molecular weight in the range of 1600 g/mol to 2500 g/mol e.g., in the range of 1600 g/mol to 2400 g/mol, or in the range of 1900 g/mol to 2300 g/mol.

Embodiment 35. A soluble dietary fiber according to any of embodiments 1-27, wherein the soluble dietary fiber has a number-average molecular weight in the range of 1000 g/mol to 1800 g/mol, e.g., in the range of 1200 g/mol to 1600 g/mol, or in the range of 1300 g/mol to 1500 g/mol.

Embodiment 36. A soluble dietary fiber according to any of embodiments 1-27, wherein the soluble dietary fiber has a weight-average molecular weight in the range of 1200 g/mol to 2500 g/mol, or 1400 g/mol to 2500 g/mol, or 1500 g/mol to 2500 g/mol, or 1600 g/mol to 2500 g/mol, or 1700 g/mol to 2500 g/mol, or 1800 g/mol to 2500 g/mol, or 1900 g/mol to 2500 g/mol, or 2000 g/mol to 2500 g/mol, or 1200 g/mol to 2400 g/mol, or 1400 g/mol to 2400 g/mol, or 1500 g/mol to 2400 g/mol, or 1600 g/mol to 2400 g/mol, or 1700 g/mol to 2400 g/mol, or 1800 g/mol to 2400 g/mol, or 1900 g/mol to 2400 g/mol, or 1200 g/mol to 2300 g/mol, or 1400 g/mol to 2300 g/mol, or 1500 g/mol to 2300 g/mol, or 1600 g/mol to 2300 g/mol, or 1700 g/mol to 2300 g/mol, or 1800 g/mol to 2300 g/mol, or 1900 g/mol to 2300 g/mol, or 2000 g/mol to 2300 g/mol.

Embodiment 37. A soluble dietary fiber according to any of embodiments 1-27, wherein the soluble dietary fiber has a weight-average molecular weight in the range of 1000 g/mol to 3000 g/mol, e.g., 1200 g/mol to 3000 g/mol, or 1400 g/mol to 3000 g/mol, or 1500 g/mol to 3000 g/mol, or 1600 g/mol to 3000 g/mol, or 1700 g/mol to 3000 g/mol, or 1800 g/mol to 3000 g/mol, or 1900 g/mol to 3000 g/mol, or 2000 g/mol to 3000 g/mol, or 1200 g/mol to 2750 g/mol, or 1400 g/mol to 2750 g/mol, or 1500 g/mol to 2750 g/mol, or 1600 g/mol to 2750 g/mol, or 1700 g/mol to 2750 g/mol, or 1800 g/mol to 2750 g/mol, or 1900 g/mol to 2750 g/mol, or 2000 g/mol 2750 g/mol Embodiment 38. A soluble dietary fiber according to any of embodiments 1-37, wherein the soluble dietary fiber has a number-average molecular weight in the range of 1000 g/mol to 2000 g/mol, e.g., in the range of 1200 g/mol to 1900 g/mol, or in the range of 1400 g/mol to 1800 g/mol.

Embodiment 39. A soluble dietary fiber according to any of embodiments 1-38, wherein the soluble dietary fiber has a polydispersity of no more than 1.8, e.g., no more than 1.7, or no more than 1.6.

Embodiment 40. A soluble dietary fiber according to any of embodiments 1-38, wherein the soluble dietary fiber has a polydispersity in the range of 1.1 to 1.8, e.g., 1.2 to 1.7, or 1.25 to 1.6.

Embodiment 41. A soluble dietary fiber according to any of embodiments 1-40, having a linkage pattern comprising:
  30-45% terminally-linked glucopyranosyl residues;
  18-30% 6-linked glucopyranosyl residues;
  4-12% 4-linked glucopyranosyl residues;
  4-13% 3-linked glucopyranosyl residues;
  3-8% 2-linked glucopyranosyl residues;
  2-10% 4,6-linked glucopyranosyl residues;
  2-7% 3,6-linked glucopyranosyl residues;
  up to 4% 3,4-linked glucopyranosyl residues; and
  up to 4% 2,4-linked glucopyranosyl residues.

Embodiment 42. A soluble dietary fiber according to any of embodiments 1-40, having a linkage pattern comprising:
  35-43% terminally-linked glucopyranosyl residues;
  20-28% 6-linked glucopyranosyl residues;
  6-11% 4-linked glucopyranosyl residues;
  6-12% 3-linked glucopyranosyl residues;
  3-8% 2-linked glucopyranosyl residues;
  3-9% 4,6-linked glucopyranosyl residues;
  2-7% 3,6-linked glucopyranosyl residues;
  up to 3% 3,4-linked glucopyranosyl residues; and
  up to 2% 2,4-linked glucopyranosyl residues.

Embodiment 43. A soluble dietary fiber according to any of embodiments 1-42, having a ratio of 6-linked glucopyranosyl residues to 4-linked glucopyranosyl residues that is at least 1, e.g., at least 1.5.

Embodiment 44. A soluble dietary fiber according to any of embodiments 1-42, having a ratio of 6-linked glucopyranosyl residues to 4-linked glucopyranosyl residues that is at least 2, e.g., at least 2.5.

Embodiment 45. A soluble dietary fiber according to any of embodiments 1-42, having a ratio of 6-linked glucopyranosyl residues to 4-linked glucopyranosyl residues that is at least 3.

Embodiment 46. A soluble dietary fiber according to any of embodiments 1-42, having a ratio of 6-linked glucopyranosyl residues to 4-linked glucopyranosyl residues that in the range of 1-4, e.g., in the range of 1.5-4, or 2-4.

Embodiment 47. A soluble dietary fiber according to any of embodiments 1-42, having a ratio of 6-linked glucopyranosyl residues to 4-linked glucopyranosyl residues that in the range of 1-4, e.g., in the range of 2.5-4, e.g., in the range of 3-4.

Embodiment 48. A soluble dietary fiber according to any of embodiments 1-42, having a ratio of 6-linked glucopyranosyl residues to 4-linked glucopyranosyl residues that in the range of 1-3.75, e.g., in the range of 1.5-3.75, or 2-3.75.

Embodiment 49. A soluble dietary fiber according to any of embodiments 1-42, having a ratio of 6-linked glucopyranosyl residues to 4-linked glucopyranosyl residues that in the range of 2.5-3.75, e.g., in the range of 3-3.75.

Embodiment 50. A soluble dietary fiber according to any of embodiments 1-42, having a ratio of 6-linked glucopyranosyl residues to 4-linked glucopyranosyl residues that in the range of 1-3.5, e.g., in the range of 1.5-3.5, or 2-3.5.

Embodiment 51. A soluble dietary fiber according to any of embodiments 1-42, having a ratio of 6-linked glucopyranosyl residues to 4-linked glucopyranosyl residues that in the range of 2.5-3.5, e.g., in the range of 3-3.5.

Embodiment 52. A soluble dietary fiber according to any of embodiments 1-51, having a glass transition temperature at 70% solids in the range of −20° C. to −50° C.

Embodiment 53. A soluble dietary fiber according to any of embodiments 1-51, having a glass transition temperature at 70% solids in the range of −30° C. to −42° C.

Embodiment 54. A soluble dietary fiber according to any of embodiments 1-53, having a viscosity at 70% DS and 10° C. of no more than 55000 cP, for example, no more than 50000 cP, or no more than 45000 cP.

Embodiment 55. A soluble dietary fiber according to any of embodiments 1-53, having a viscosity at 70% DS and 10° C. in the range of 30000-55000 cP, e.g., 30000-50000 cP, or 30000-45000 cP, or 35000-55000 cP, or 35000-50000 cP, or 35000-45000 cP, or 40000-55000 cP, or 40000-50000 cP, or 40000-45000 cP.

Embodiment 56. A method for improving body in a fermented beverage, the method including providing a soluble dietary fiber of any of embodiments 1-55 in the fermented beverage.

Embodiment 57. The method of embodiment 56, wherein providing the soluble dietary fiber in the fermented beverage includes providing a fermentable wort, combining the soluble dietary fiber with the fermentable wort, and fermenting the fermentable wort including the soluble dietary fiber to provide the fermented beverage.

Embodiment 58. The method of embodiment 56, wherein providing the soluble dietary fiber in the fermented beverage includes providing a mash by combining grains and water, including the soluble dietary fiber in the mash, collecting a fermentable wort including the soluble dietary fiber from the mash, and fermenting the fermentable wort to provide the fermented beverage.

Embodiment 59. The method of embodiment 56, wherein the providing the soluble dietary fiber in the fermented beverage includes providing a fermented beverage and combining the soluble dietary fiber in the fermented beverage.

Embodiment 60. A fermented beverage comprising a soluble dietary fiber according to any of embodiments 1-55.

Embodiment 61. A method or fermented beverage according to any of embodiments 56-60, wherein the fermented beverage is a beer (e.g., an ale or a lager).

Embodiment 62. A method or fermented beverage according to any of embodiments 56-60, wherein the fermented beverage is a wine or a cider.

Embodiment 63. A method or fermented beverage according to any of embodiments 56-60, wherein the fermented beverage is a mead or a rice wine.

Embodiment 64. A method or fermented beverage according to any of embodiments 56-60, wherein the fermented beverage is a kombucha or a sauerkraut juice.

Embodiment 65. The method or fermented beverage according to any of embodiments 56-64, wherein the fermented beverage contains alcohol.

Embodiment 66. The method or fermented beverage according to any of embodiments 56-64, wherein the fermented beverage has been treated to remove alcohol.

Embodiment 67. The method or fermented beverage according to any of embodiments 56-64, wherein the fermented beverage contains no more than 1.2 vol % alcohol, e.g., no more than 0.5 vol % alcohol, or no more than 0.2 vol % alcohol.

Embodiment 68. The method or fermented beverage according to any of embodiments 56-64, wherein the fermented beverage contains between 0.10 vol % and 1.2 vol % alcohol, e.g., between 0.50 vol % and 1.2 vol % alcohol.

Embodiment 69. The method or fermented beverage according to any of embodiments 56-64, wherein the fermented beverage contains essentially no alcohol, e.g., no more than 0.10 vol % alcohol, or no more than 0.05 vol % alcohol.

Embodiment 70. A method for making a food or beverage product, the method comprising:
providing a soluble dietary fiber according to any of embodiments 1-55, and
combining the soluble dietary fiber with one or more other food or beverage ingredients.

Embodiment 71. A food or beverage product made by a method according to embodiment 70.

Embodiment 72. A food or beverage product comprising the soluble dietary fiber according to embodiments 1-55.

Embodiment 73. The food or beverage product of embodiment 72, made by a method according to embodiment 70.

Embodiment 74. The method or food or beverage product according to any of embodiments 70-73, wherein the food or beverage product is fermented or cultured.

Embodiment 75. The method or food or beverage product according to any of embodiments 70-73, wherein the food or beverage product is a spirit, a liqueur, or a spirit alternative (e.g., low-alcohol or low-calorie spirit).

Embodiment 76. The method or food or beverage product according to any of embodiments 70-73, wherein the food or beverage product is a cocktail or mixed drink, e.g., a margarita, old-fashioned, or mulled wine.

Embodiment 77. The method or food or beverage product according to any of embodiments 70-73, wherein the food or beverage product is a cocktail mix, e.g., a margarita mix.

Embodiment 78. The method or food or beverage product according to any of embodiments 70-73, wherein the food or beverage product is a dairy product.

Embodiment 79. The method or food or beverage product according to any of embodiments 70-73, wherein the food or beverage product is a dairy-based beverage and respective analogs, e.g., dairy drink with added fruit or cereal grains, dairy-based smoothie, yogurt, kefir, drinkable yogurt, long shelf life yogurt, dairy-based meal replacement drink, dairy-based drink mix, quark, ice cream, egg nog.

Embodiment 80. The method or food or beverage product according to any of embodiments 70-73, wherein the food or beverage product is a dairy alternative, e.g., nut milk, oat milk, dairy-free beverage mix, cereal or grain drink, almond milk, rice milk, cashew milk, soy milk, hemp milk, coconut milk.

Embodiment 81. The method or food or beverage product according to any of embodiments 70-73, wherein the food or beverage product is a tea or coffee, e.g., tea or coffee drink mix, textured tea or textured coffee, a tea or coffee for enhanced digestive health, cold brew coffee.

Embodiment 82. The method or food or beverage product according to any of embodiments 70-73, wherein the food or beverage product is a juice or a fruit/vegetable drink, e.g., fruit juice, concentrated juice mix, vegetable juice, vegetable juice mix, blended juice, fruit or vegetable puree, coulis.

Embodiment 83. The method or food or beverage product according to any of embodiments 70-73, wherein the food or beverage product is a water e.g., flavored water, unflavored water, sparkling water, carbonated water, flavored water mix, sparkling water mix.

Embodiment 84. The method or food or beverage product according to any of embodiments 70-73, wherein the food or beverage product is a slimming beverage.

Embodiment 85. The method or food or beverage product according to any of embodiments 70-73, wherein the food or beverage product is a coarse grain food or beverage product, e.g., beverage made with coarse grains, coarse grain drink mix, coarse grain drink combined with juice or dairy drink or coffee drink or tea drink or fermented drink.

Embodiment 86. The method or food or beverage product according to any of embodiments 70-73, wherein the food or beverage product is a cereal, a granola, a muesli, a topping, a coating, a baked good (e.g., cookie, a biscuit, a bread, a pastry, a pizza crust, a flatbread), a bar (e.g., snack bar, cereal bar, granola bar, energy bar), a meat alternative, a filling (e.g., a fruit filling or a crème filling), a fruit snack such as a fruit leather, a pasta, a sweetener, a frozen dessert, a dairy product (e.g., a yogurt, a quark, an ice cream), a dairy alternative product (e.g. yoghurt alternative), a glaze, a frosting, a syrup, a pet food, a medical food, a flavoring, or a dry blend.

What is claimed is:

1. A method for improving body in a fermented beverage, the method comprising providing a soluble dietary fiber having a fiber content of at least 97% as measured on a dry solids basis as measured by AOAC 2001.03 and a combined DP1+DP2 content of no more than 3 wt % on a dry solids basis in the fermented beverage, wherein the soluble dietary fiber has a linkage pattern comprising:
   30-45% terminally-linked glucopyranosyl residues;
   18-30% 6-linked glucopyranosyl residues;
   4-12% 4-linked glucopyranosyl residues;
   4-13% 3-linked glucopyranosyl residues;
   3-8% 2-linked glucopyranosyl residues;
   2-10% 4,6-linked glucopyranosyl residues;
   2-7% 3,6-linked glucopyranosyl residues;
   up to 4% 3,4-linked glucopyranosyl residues; and
   up to 4% 2,4-linked glucopyranosyl residues.

2. The method of claim 1, wherein the providing the soluble dietary fiber in the fermented beverage includes providing a fermentable wort, combining the soluble dietary fiber with the fermentable wort, and fermenting the fermentable wort including the soluble dietary fiber to provide the fermented beverage.

3. The method of claim 1, wherein the providing the soluble dietary fiber in the fermented beverage includes providing a mash by combining grains and water, including the soluble dietary fiber in the mash, collecting a fermentable wort including the soluble dietary fiber from the mash, and fermenting the fermentable wort to provide the fermented beverage.

4. The method of claim 1, wherein the providing the soluble dietary fiber in the fermented beverage includes providing a fermented beverage and combining the soluble dietary fiber in the fermented beverage.

5. The method according to claim 1, wherein the soluble dietary fiber has a fiber content of at least 99%.

6. The method according to claim 1, wherein the soluble dietary fiber has a DP1+DP2 content of no more than 1.0 wt % on a dry solids basis.

7. The method according to claim 1, wherein the soluble dietary fiber has a DP2 content of no more than 1.0 wt % on a dry solids basis.

8. The method according to claim 1, wherein the soluble dietary fiber has a DP1 content of no more than 1.0 wt % on a dry solids basis.

9. The method according to claim 1, wherein the soluble dietary fiber has at least 99 wt % dextrose residues on a dry solids basis.

10. The method according to claim 1, wherein the soluble dietary fiber has no more than 0.5 wt % sugar alcohol residues on a dry solids basis.

11. The method according to claim 1, wherein the soluble dietary fiber has a weight-average molecular weight in the range of 1000 g/mol to 2500 g/mol.

12. The method according to claim 1, wherein the soluble dietary fiber has a polydispersity of no more than 1.8.

13. The method according to claim 1, wherein the soluble dietary fiber has a ratio of 6-linked glucopyranosyl residues to 4-linked glucopyranosyl residues in the range of 2.5-4.

14. The method according to claim 1, wherein the soluble dietary fiber has a glass transition temperature at 70% solids in the range of −20° C. to −50° C.

15. The method according to claim 1, wherein the soluble dietary fiber has a viscosity at 70% DS and 10° C. of no more than 55000 cP.

16. The method according to claim 1, wherein the fermented beverage is a beer.

17. The method according to claim 1, wherein the fermented beverage is a wine.

18. The method according to claim 1, wherein the fermented beverage is a cider, a mead, or a rice wine.

19. The method according to claim 1, wherein the fermented beverage is a kombucha or a sauerkraut juice.

20. The method of claim 1, wherein the fermented beverage contains alcohol.

21. The method of claim 1, wherein the fermented beverage contains no more than 1.2 vol % alcohol.

* * * * *